United States Patent
Deane et al.

(10) Patent No.: US 11,859,029 B2
(45) Date of Patent: Jan. 2, 2024

(54) METHODS OF SYNTHESIS OF HOMOPOLYMERS AND NON-HOMOPOLYMERS COMPRISING REPEATING UNITS DERIVED FROM MONOMERS COMPRISING LACTAM AND ACRYLOYL MOIETIES IN AN AQUEOUS MEDIUM

(71) Applicant: ISP INVESTMENTS LLC, Wilmington, DE (US)

(72) Inventors: Oliver Johnathan Deane, Sheffield (GB); Osama M. Musa, Bedminster, NJ (US); Steven Peter Armes, Sheffield (GB); Alan Fernyhough, Bradford (GB); Rebecca Roisin Gibson, Sheffield (GB)

(73) Assignee: ISP INVESTMENTS LLC, Wilmington, DE (US)

(*) Notice: Subject to any disclaimer, the term of this patent is extended or adjusted under 35 U.S.C. 154(b) by 171 days.

(21) Appl. No.: 16/786,959

(22) Filed: Feb. 10, 2020

(65) Prior Publication Data

US 2020/0407470 A1 Dec. 31, 2020

Related U.S. Application Data

(63) Continuation-in-part of application No. 16/522,129, filed on Jul. 25, 2019, now abandoned.
(Continued)

(51) Int. Cl.
*C08F 120/28* (2006.01)
*C08F 120/36* (2006.01)
(Continued)

(52) U.S. Cl.
CPC .............. *C08F 2/10* (2013.01); *C08F 120/34* (2013.01); *C08F 293/005* (2013.01);
(Continued)

(58) Field of Classification Search
None
See application file for complete search history.

(56) References Cited

U.S. PATENT DOCUMENTS

2019/0015304 A1* 1/2019 Musa .................. C08L 35/02

FOREIGN PATENT DOCUMENTS

WO WO-2017123572 A1 * 7/2017 .............. A61K 8/06

OTHER PUBLICATIONS

Deane, O. J. et al. "Synthesis of Well-Defined Pyrrolidone-Based Homopolymers and Stimulus-Responsive Diblock Copolymers via RAFT Aqueous Solution Polymerization of 2-(N-Acryloyloxy)ethylpyrrolidone". Macromolecules 2018, 51(19), 7756-7766. (Year: 2018).*
(Continued)

*Primary Examiner* — Richard A Huhn
(74) *Attorney, Agent, or Firm* — William J. Davis; Nathalie Tietcheu

(57) ABSTRACT

The invention provides a method for preparation of homopolymers and non-homopolymers comprising polymerizing in an aqueous medium a monomer comprising at least one acryloyl moiety and at least one functionalized or unfunctionalized lactam moiety, and optionally at least one hydrophilic or hydrophobic comonomer, in the presence of at least one chain transfer agent and at least one non-radiation initiator. Exemplary diblock polymers prepared by the method have the structure:
(Continued)

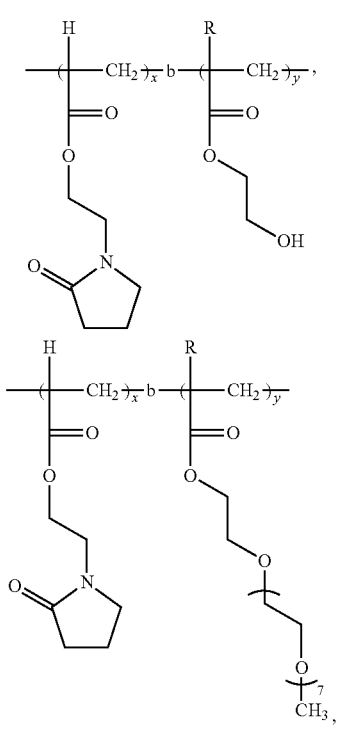

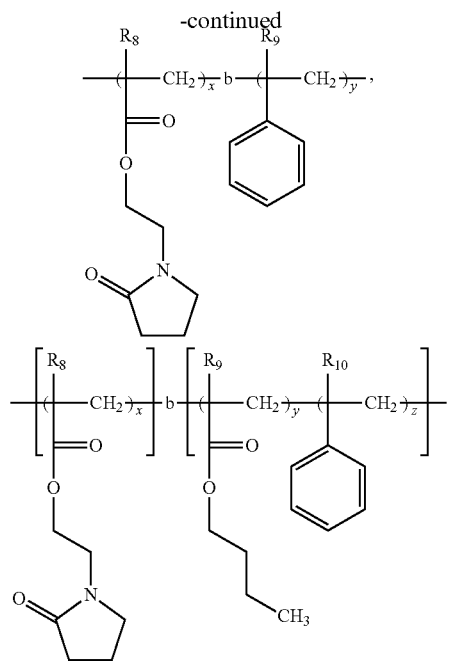

where subscripts x, y, and z and variables R, $R_8$, $R_9$ and $R_{10}$ are described herein.

3 Claims, 3 Drawing Sheets

Related U.S. Application Data

(60) Provisional application No. 62/703,384, filed on Jul. 25, 2018.

(51) Int. Cl.
  *C08F 126/06* (2006.01)
  *C08F 2/10* (2006.01)
  *C08F 293/00* (2006.01)
  *C08F 120/34* (2006.01)

(52) U.S. Cl.
  CPC .......... *C08F 120/28* (2013.01); *C08F 120/36* (2013.01); *C08F 126/06* (2013.01); *C08F 2438/03* (2013.01)

(56) References Cited

OTHER PUBLICATIONS

Perrier, S., "50th Anniversary Perspective: RAFT Polymerization—A User Guide". Macromolecules 2017, 50, 7433-7447. (Year: 2017).*

Cunningham, V. J. et al., "Poly(N-2-(methacryloyloxy)ethyl pyrrolidone)-poly(benzyl methacrylate) diblock copolymer nanoobjects via RAFT alcoholic dispersion polymerisation in ethanol". Polymer 2016, 106, 189-199. (Year: 2016).*

* cited by examiner

METHODS OF SYNTHESIS OF HOMOPOLYMERS AND NON-HOMOPOLYMERS COMPRISING REPEATING UNITS DERIVED FROM MONOMERS COMPRISING LACTAM AND ACRYLOYL MOIETIES IN AN AQUEOUS MEDIUM

CROSS-REFERENCE TO RELATED APPLICATIONS

This application is a continuation in part of U.S. application Ser. No. 16/522,129 filed on Jul. 25, 2019, which claims the benefit of U.S. Provisional Patent Application Ser. No. 62/703,384, filed on Jul. 25, 2018, the entire contents of both of which are incorporated herein by reference in their entirety.

BACKGROUND

1. Field of the Invention

The disclosed and/or claimed inventive concept(s) provides methods for preparation of homopolymers and non-homopolymers comprising polymerizing in an aqueous medium a monomer comprising at least one acryloyl moiety and at least one functionalized or unfunctionalized lactam moiety, and optionally at least one hydrophilic or hydrophobic comonomer, in the presence of at least one chain transfer agent and at least one non-radiation initiator.

2. Description of Related Art

It is well-known that AB type of diblock copolymers undergo self-assembly both in the solid state and also in solution. In the latter case, a diverse range of copolymer morphologies has been reported, including spheres, worms, or vesicles. Typically, the copolymer chains are first prepared in a non-selective solvent and then subjected to either a gradual change in solvency or a pH switch in a separate step, which is typically undertaken in dilute solution.

In recent years, polymerization-induced self-assembly (PISA) of diblock copolymers in a solvent that is selective for the growing second block has become increasingly popular. PISA offers two decisive advantages over traditional processing methods: (i) syntheses can be conducted at up to 50% w/w solids and (ii) diblock copolymer nanoparticles are obtained directly, without requiring any post-polymerization processing steps. When combined with PISA, controlled radical polymerization techniques such as atom transfer radical polymerization (ATRP) or reversible addition—fragmentation chain transfer (RAFT) polymerization have enabled the preparation of a wide range of well-defined nanoparticles. RAFT dispersion polymerization is known to allow the efficient synthesis of pure spherical, worm-like or vesicular morphologies in aqueous, alcoholic, or non-polar media as well as ionic liquids.

Synthesis and self-assembly behaviors of well-defined poly(lauryl methacrylate)-block-poly [N-(2-methacryloylxyethyl)pyrrolidone] copolymers is described by Zhang and coworkers in *Colloid and Polymer Science,* 2013, volume 291, 2653-2662.

Direct electrochemistry and electrocatalysis of hemoglobin immobilized in an amphiphilic diblock copolymer film is described by Jia and coworkers in *Sensors & Actuators: B. Chemical,* 2009, volume 138, 244-250.

Facile synthesis and thermoresponsive behavior of a well-defined pyrrolidone based hydrophilic polymer is described by Deng and coworkers in *Macromolecules,* 2008, volume 41, 3007-3014.

Effect of mild visible light on rapid aqueous RAFT polymerization of water-soluble acrylic monomers at ambient temperature: initiation and activation is described by Cai and coworkers in *Macromolecules,* 2009, volume 42, 3917-3926.

Pyrrolidone-functional smart polymers via nitroxide-mediated polymerization is described by Savelyeva and coworkers in *J Poly Sci. Part A Polymer Chem.,* 2014, volume 52, issue 14, 2011-2024.

Effect of molecular structure on thermoresponsive behaviors of pyrrolidone-based water-soluble polymers is described by Cai and coworkers in *Macromolecules,* 2010, volume 43, 4041-4049.

U.S. published Pat. App. 2005/0238594 discloses ethylenic copolymers comprising a vinyllactam block, cosmetic or pharmaceutical compositions comprising them and cosmetic use of these copolymers.

It has been found that aqueous methods of polymerization according to the disclosed and/or claimed inventive concept(s) provide several classes of polymers such as homopolymers, diblock copolymers, or multiblock polymers having unique and important performance attributes due to which they can be advantageously used in various industrial applications including personal care. Non-limiting examples of personal care applications include sun care compositions, face care compositions, lip care compositions, eye care compositions, skin care compositions, after-sun compositions, body care compositions, nail care compositions, anti-aging compositions, insect repellants, oral care compositions, deodorant compositions, hair care compositions, conditioning compositions, color cosmetic compositions, color-protection compositions, self-tanning compositions, and foot care compositions.

SUMMARY

In a first aspect, the disclosed and/or claimed inventive concept(s) provides a method for preparation of a homopolymer comprising contacting in an aqueous medium: (1) a monomer comprising at least one acryloyl moiety and at least one functionalized or unfunctionalized lactam moiety, (2) at least one chain transfer agent, and (3) at least one non-radiation initiator.

In a second aspect, the disclosed and/or claimed inventive concept(s) provides a method for preparation of a non-homopolymer comprising contacting in an aqueous medium: (1) a macromolecular chain transfer agent derived from at least one monomer A, (2) at least one monomer B, and (3) at least one non-radiation initiator, with the proviso that at least one of said monomer A and monomer B, but not both, is a monomer comprising at least one acryloyl moiety and at least one functionalized or unfunctionalized lactam moiety and other said monomer A or monomer B is a dissimilar comonomer.

BRIEF DESCRIPTION OF THE FIGURES

Further embodiments of the present application can be understood with the appended figures.

DETAILED DESCRIPTION

Figure 1:
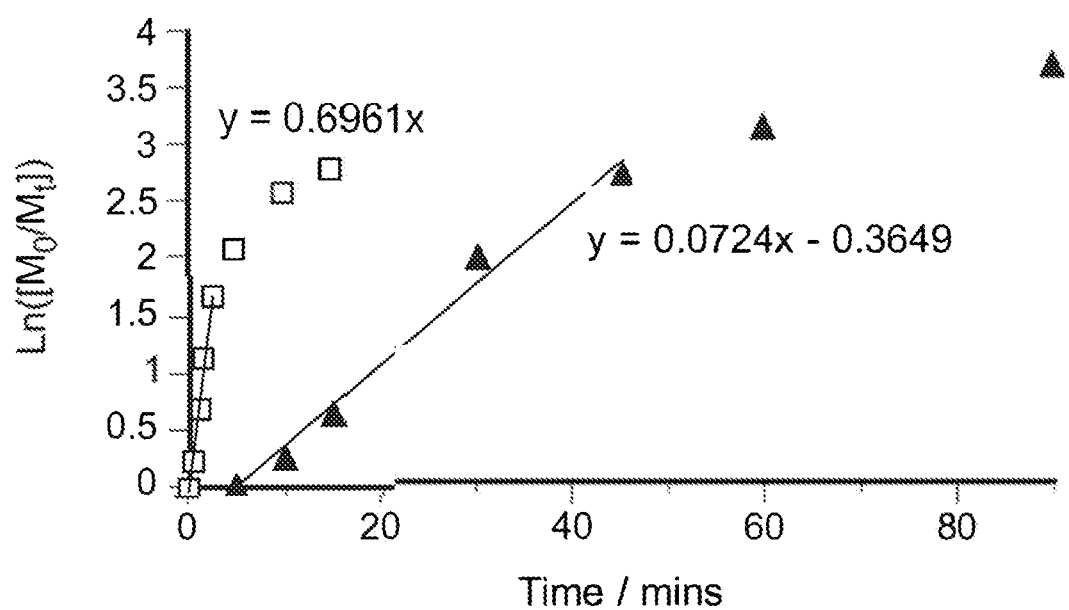
FIG. 1 represents a semi-logarithmic plots obtained for the RAFT aqueous solution polymerization of NAEP using a DDMAT/initiator molar ratio of 5.0 when using the AIBN initiator (triangles) at 70° C. or the KPS/AsAc redox initiator (squares) at 30° C. (target degree of polymerization=200 at 60% w/w solids). Equations indicate the gradients associated with each plot; which are proportional to the respective initial rates.
Figure 2:
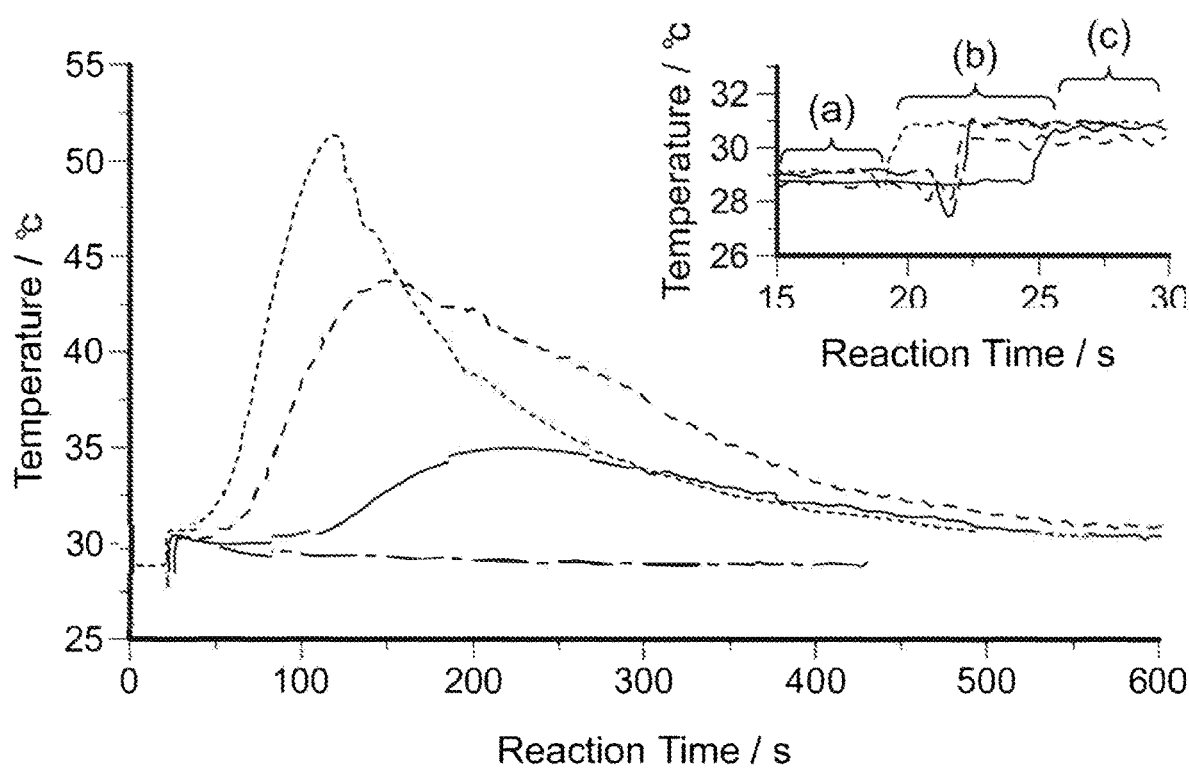
FIG. 2 shows the Temperature vs. reaction time plots for the RAFT aqueous homopolymerization of NAEP targeting a DP of 200 using DDMAT/KPS molar ratios of 5.0 (dot plot . . . ), 50.0 (dash plot - - - ) and 100.0 (solid plot _____). The black data set (plot _____) represents the control experiment where the two reaction solutions (see experimental) were added in the absence of any initiator.
Figure 3:
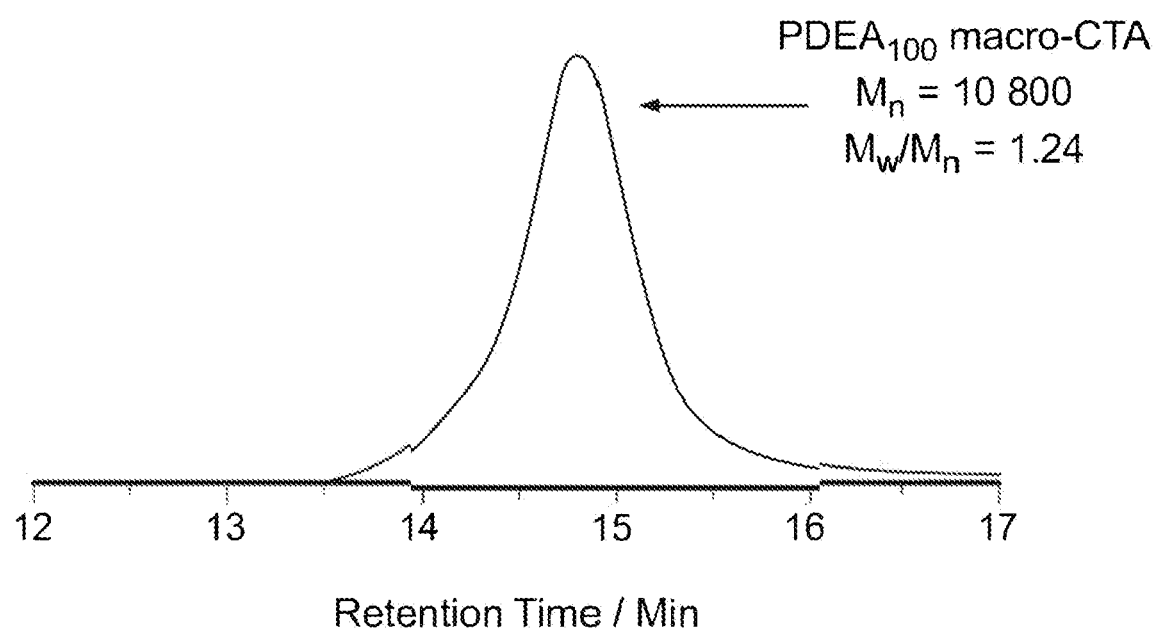
FIG. 3 represents the Chloroform GPC curve recorded for a $PDEA_{100}$ macro-CIA prepared via RAFT solution polymerization of DEA in THF at 70° C.

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following description or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

Unless otherwise defined herein, technical terms used in connection with the disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications referenced in any portion of this application are herein expressly incorporated by reference herein their entirety to the same extent as if each individual patent or publication was specifically and individually indicated to be incorporated by reference.

All of the articles and/or methods disclosed herein can be made and executed without undue experimentation in light of the present disclosure. While the articles and methods of the disclosed and/or claimed inventive concept(s) have been described in terms of aspects, it will be apparent to those of ordinary skill in the art that variations may be applied to the articles and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

As utilized in accordance with the disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or."

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, $B_{Xn}$, $B_{Xn+1}$, or combinations thereof" is intended to include at least one of: A, $B_{Xn}$, $B_{Xn+1}$, $AB_{Xn}$, A $B_{Xn+1}$, $B_{Xn}B_{Xn+1}$, or $AB_{Xn}B_{Xn+1}$ and, if order is important in a particular context, also $B_{Xn}A$, $B_{Xn+1}A$, $B_{Xn+1}B_{Xn}$, $B_{Xn+1}B_{Xn}A$, $B_{Xn}B_{Xn+1}A$, $AB_{Xn+1}B_{Xn}$, $B_{Xn}AB_{Xn+1}$, or $B_{Xn+1}AB_{Xn}$. Continuing with this example, expressly included are combinations that contain repeats of one or more item or term, such as $B_{Xn}B_{Xn}$, AAA, $MB_{Xn}$, $B_{Xn}B_{Xn}B_{Xn+1}$, $AAAB_{Xn}B_{Xn+1}B_{Xn+1}B_{Xn+1}$ $B_{Xn+1}$, $B_{Xn+1}B_{Xn}B_{Xn}AAA$, $B_{Xn+1}A$ $B_{Xn}AB_{Xn}B_{Xn}$, and so forth. The skilled artisan will understand that typically there is no limit on the number of items or terms in any combination, unless otherwise apparent from the context.

The term "each independently selected from the group consisting of" means when a group appears more than once in a structure, that group may be selected independently each time it appears.

The term "hydrocarbyl" includes straight-chain and branched-chain alkyl, alkenyl, alkynyl, cycloalkyl, cycloalkenyl, aryl groups, and combinations thereof with optional heteroatom(s). A hydrocarbyl group may be mono-, di- or polyvalent.

The term "alkyl" refers to a functionalized or unfunctionalized, monovalent, straight-chain, branched-chain, or cyclic $C_1$-$C_{60}$ hydrocarbyl group optionally having one or more heteroatoms. In one non-limiting embodiment, an alkyl is a $C_1$-$C_{45}$ hydrocarbyl group. In another non-limiting embodiment, an alkyl is a $C_1$-$C_{30}$ hydrocarbyl group. Non-limiting examples of alkyl include methyl, ethyl, n-propyl, isopropyl, n-butyl, isobutyl, tert-butyl, n-pentyl, isopentyl, n-hexyl, n-heptyl, n-octyl, 2-ethylhexyl, tert-octyl, iso-norbornyl, n-dodecyl, tert-dodecyl, n-tetradecyl, n-hexadecyl, n-octadecyl, n-eicosyl, cyclobutyl, cyclopentyl, cyclohexyl, and the like. The definition of "alkyl" also includes groups obtained by combinations of straight-chain, branched-chain and/or cyclic structures.

The term "aryl" refers to a functionalized or unfunctionalized, monovalent, aromatic hydrocarbyl group optionally having one or more heteroatoms. The definition of aryl includes carbocyclic and heterocyclic aromatic groups. Non-limiting examples of aryl groups include phenyl, naphthyl, indenyl, indanyl, azulenyl, fluorenyl, anthracenyl, furyl, thienyl, pyridyl, pyrrolyl, oxazolyl, thiazolyl, imidazolyl, pyrazolyl, 2-pyrazolinyl, pyrazolidinyl, isoxazolyl, isothiazolyl, 1,2,3-oxadiazolyl, 1,2,3-triazolyl, 1,3,4-thiadiazolyl, pyridazinyl, pyrimidinyl, pyrazinyl, 1,3,5-triazinyl, 1,3,5-trithianyl, indolizinyl, indolyl, isoindolyl, 3H-indolyl, indolinyl, benzo[b]furanyl, 2,3-dihydrobenzofuranyl, benzothiophenyl, 1H-indazolyl, benzimidazolyl, benzthiazolyl, purinyl, 4H-quinolizinyl, isoquinolinyl, cinnolinyl, phthalazinyl, quinazolinyl, quinoxalinyl, 1,8-naphthridinyl, pteridinyl, carbazolyl, acridinyl, phenazinyl, phenothiazinyl, phenoxyazinyl, pyrazolotriazinyl, and the like.

The term "aralkyl" refers to an alkyl group comprising one or more aryl substituent(s) wherein "aryl" and "alkyl" are as defined above. Non-limiting examples of aralkyl groups include benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like.

The term "alkylene" refers to a functionalized or unfunctionalized, divalent, straight-chain, branched-chain, or cyclic $C_1$-$C_{40}$ hydrocarbyl group optionally having one or more heteroatoms. In one non-limiting embodiment, an alkylene is a $C_1$-$C_{30}$ group. In another non-limiting embodiment, an alkylene is a $C_1$-$C_{20}$ group. Non-limiting examples of alkylene groups include:

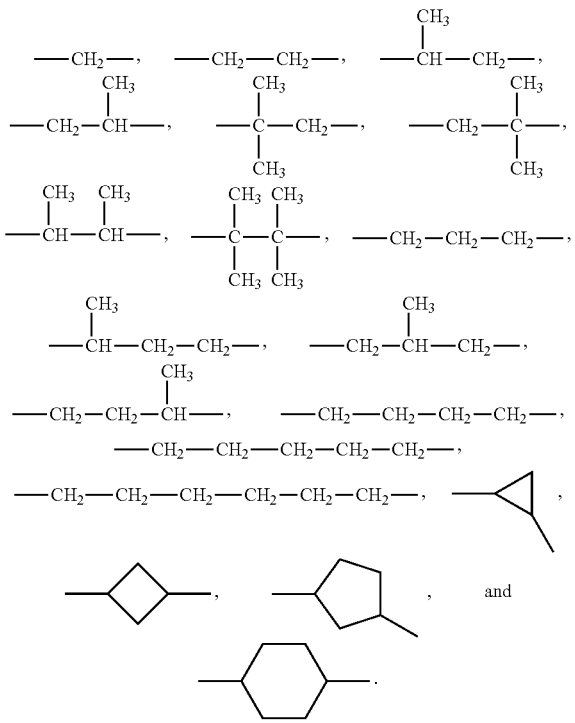

The term "arylene" refers to a functionalized or unfunctionalized, divalent, aromatic hydrocarbyl group optionally having one or more heteroatoms. The definition of arylene includes carbocyclic and heterocyclic groups. Non-limiting examples of arylene groups include phenylene, naphthylene, pyridinylene, and the like.

The term "heteroatom" refers to oxygen, nitrogen, sulfur, silicon, phosphorous, or halogen. The heteroatom(s) may be present as a part of one or more heteroatom-containing functional groups. Non-limiting examples of heteroatom-containing functional groups include ether, hydroxy, epoxy, carbonyl, carboxamide, carboxylic ester, carboxylic acid, imine, imide, amine, sulfonic, sulfonamide, phosphonic, and silane groups. The heteroatom(s) may also be present as a part of a ring such as in heteroaryl and heteroarylene groups.

The term "halogen" or "halo" refers to Cl, Br, I, or F.

The term "ammonium" includes protonated $NH_3$ and protonated primary, secondary, and tertiary organic amines.

The term "functionalized" with reference to any moiety refers to the presence of one or more functional groups in the moiety. Various functional groups may be introduced in a moiety by way of one or more functionalization reactions known to a person having ordinary skill in the art. Non-limiting examples of functionalization reactions include: alkylation, epoxidation, sulfonation, hydrolysis, amidation, esterification, hydroxylation, dihydroxylation, amination, ammonolysis, acylation, nitration, oxidation, dehydration, elimination, hydration, dehydrogenation, hydrogenation, acetalization, halogenation, dehydrohalogenation, Michael addition, aldol condensation, Canizzaro reaction, Mannich reaction, Clasien condensation, Suzuki coupling, and the like. In one non-limiting embodiment, the term "functionalized" with reference to any moiety refers to the presence of one more functional groups selected from the group consisting of alkyl, alkenyl, hydroxyl, carboxyl, halogen, alkoxy, amino, imino, and combinations thereof, in the moiety.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues. The polymer may have a random, block, and/or alternating architecture.

The term "homopolymer" refers to a polymer that consists essentially of a single monomer type.

The term "non-homopolymer" refers to a polymer that comprises more than one monomer types.

The term "copolymer" refers to a non-homopolymer that comprises two different monomer types.

The term "terpolymer" refers to a non-homopolymer that comprises three different monomer types.

The term "branched" refers to any non-linear molecular structure. The term includes both branched and hyper-branched structures.

The term "block copolymer" refers to a polymer comprising at least two blocks of polymerized monomers. Any block may be derived from either a single monomer resulting in a homopolymeric subunit, or two or more monomers resulting in a copolymeric (or non-homopolymeric) subunit in the block copolymer. The block copolymers may be diblock copolymers (i.e., polymers comprising two blocks of monomers), triblock copolymers (i.e., polymers comprising three blocks of monomers), multiblock copolymers (i.e., polymers comprising more than three blocks of monomers), or combinations thereof. The block copolymers may be linear, branched, star or comb like, and have structures such as [A][B], [A][B][A], [A][B][C], [A][B][A][B], [A][B][C][B], etc. An exemplary representation of block copolymer is $[A]_x[B]_y$ or $[A]_x[B]_y[C]_z$, wherein x, y and z are the degrees of polymerization (DP) of the corresponding blocks [A], [B], and [C]. Additional insight into the chemistry, characterization and applications of block copolymers may be found in the book '*Block Copolymers: Synthetic Strategies, Physical Properties, and Applications*', by Nikos Hadjichristidis, Stergios Pispas, and George Floudas, John Wiley and Sons (2003), the contents of which are herein incorporated in its entirety by reference.

The term "controlled radical polymerization" refers to a specific radical polymerization process, also denoted by the term of "living radical polymerization", in which use is made of control agents, such that the polymer chains being formed are functionalized by end groups capable of being reactivated in the form of free radicals by reversible transfer or reversible termination reactions.

The control agents used in controlled radical polymerization reactions are termed "chain transfer agents". These agents can be in the form of (A) low molecular weight compounds that are typically added as molecular weight modifiers during the preparation of homopolymers, or (B) macromolecular chain transfer agents that are formed by end group functionalization of the polymer chains formed during homopolymerization reactions that are typically added as molecular weight modifiers during the preparation of non-homopolymers such as, for example, diblock copolymers and multiblock polymers.

The term "addition-fragmentation" refers to a two-step chain transfer mechanism during polymerization of block copolymers wherein a radical addition is followed by fragmentation to generate a new radical species.

The term "free radical addition polymerization initiator" refers to a compound used in a catalytic amount to initiate a free radical addition polymerization. The choice of initiator depends mainly upon its solubility and its decomposition temperature.

The term "non-radiation initiator" refers to a free radical polymerization initiator that can generate free radicals when subjected to a non-radiation source of energy. In the context of the disclosed and/or claimed inventive concepts, the method of preparation of homopolymers and non-homopolymers involving contact with at least one non-radiation initiator is meant to imply that the method does not involve exposure to radiation as a source of energy for generating free radicals to activate the reaction. The non-radiation method according to the disclosed and/or claimed inventive concepts provides superior reaction yields and polymer purity as well as excellent control over distribution of molecular weights of the resulting homopolymers and non-homopolymers. These attributes are much superior to what is known in related art.

The term "thermochemical initiator" refers to a free radical polymerization initiator that generates free radicals when subjected to thermal energy.

The term "non-aqueous solvent" refers to non-polar organic solvents and polar organic solvents.

The term "alkyl acrylate" refers to an alkyl ester of an acrylic acid or an alkyl acrylic acid.

The term "alkyl acrylamide" refers to an alkyl amide of an acrylic acid or an alkyl acrylic acid.

The term "moiety" refers to a part or a functional group of a molecule.

In the block copolymer structures, the notation—b—on the polymer backbone is meant to denote block configuration of repeating units. An exemplary block copolymer structure is shown below:

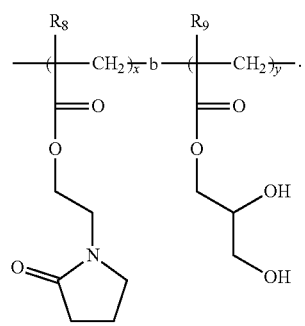

The term "colloidal" refers to the state of matter having nanometer dimensions.

The terms "personal care composition" and "cosmetics" refer to compositions intended for use on or in the human body, such as skin, sun, hair, oral, cosmetic, and preservative compositions, including those to alter the color and appearance of skin and hair.

The term "pharmaceutical composition" refers to any composition comprising at least one pharmaceutically active ingredient, as well as any product which results, directly or indirectly, from combination, complexation, or aggregation of any two or more of the ingredients, from dissociation of one or more of the ingredients, or from other types of reactions or interactions of one or more of the ingredients.

The term "coating composition" refers to an aqueous-based or solvent-based liquid composition that may be applied to a substrate and thereafter solidified (for example, by radiation, air curing, post-crosslinking or ambient temperature drying) to form a hardened coating on the substrate.

The term "oilfield composition" refers to a composition that may be used in the exploration, extraction, recovery, and/or completion of any hydrocarbon. Non-limiting examples of oilfield compositions include drilling fluids, cementing fluids, anti-agglomerants, kinetic hydrate inhibitors, shale swelling inhibitors, drilling muds, servicing fluids, gravel packing muds, friction reducers, fracturing fluids, completion fluids, and work over fluids.

The term "hydrophilic monomer" refers to a monomer having solubility in water of greater than about 10 percent by weight at 25° C.

The term "hydrophobic monomer" refers to a monomer having solubility in water of lesser than about 10 percent by weight at 25° C.

All percentages, ratio, and proportions used herein are based on a weight basis unless other specified.

In a first aspect, the disclosed and/or claimed inventive concept(s) provides a method for preparation of a homopolymer comprising contacting in an aqueous medium: (1) a monomer comprising at least one acryloyl moiety and at least one functionalized or unfunctionalized lactam moiety, (2) at least one chain transfer agent, and (3) at least one non-radiation initiator.

In one non-limiting embodiment, the chain transfer agent is a reversible addition-fragmentation chain transfer agent.

In one non-limiting embodiment, the non-radiation initiator is a thermochemical initiator.

In one non-limiting embodiment, the aqueous medium further comprises at least one non-aqueous solvent.

Non-limiting examples of non-aqueous solvents include functionalized or unfunctionalized alcohols, acids, ethers, ketones, nitriles, lactones, esters, amines, amides, carbonates, carbamates, halocarbons, hydrocarbons, and combinations thereof.

In one non-limiting embodiment, the monomer comprising at least one acryloyl moiety and at least one functionalized or unfunctionalized lactam moiety has a structure:

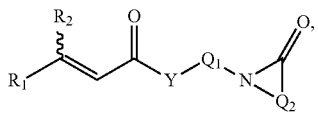

wherein each $R_1$ and $R_2$ is independently selected from the group consisting of hydrogen, halogens, functionalized and unfunctionalized $C_1$-$C_4$ alkyl, and

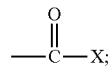

each X is independently selected from the group consisting of $OR_3$, OM, halogen, $N(R_4)(R_5)$,

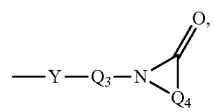

and combinations thereof; each Y is independently oxygen, $NR_6$ or sulfur; each $R_3$, $R_4$, $R_5$, and $R_6$ is independently selected from the group consisting of hydrogen, functionalized and unfunctionalized alkyl, and combinations thereof; each M is independently selected from the group consisting of metal ions, ammonium ions, organic ammonium cations, and combinations thereof; and each $Q_1$, $Q_2$, $Q_3$, and $Q_4$ is independently a functionalized or unfunctionalized alkylene.

In one non-limiting embodiment, each $Q_1$, $Q_2$, $Q_3$, and $Q_4$ is independently selected from the group consisting of functionalized and unfunctionalized $C_1$-$C_{12}$ alkylene. Non-limiting examples of such alkylene groups include —$CH_2$—, —$CH_2$—$CH_2$—, —$CH(CH_3)$—$CH_2$—, —$CH_2$—$CH(CH_3)$—, —$C(CH_3)_2$—$CH_2$—, —$CH_2$—$C(CH_3)_2$—, —$CH(CH_3)$—$CH(CH_3)$—, —$C(CH_3)_2$—$C(CH_3)_2$—, —$CH_2$—$CH_2$—$CH_2$—, —$CH(CH_3)$—$CH_2$—$CH_2$—, —$CH_2$—$CH(CH_3)$—$CH_2$—, —$CH_2$—$CH_2$—$CH(CH_3)$—, —$CH_2$—$CH_2$—$CH_2$—$CH_2$—, —$CH_2$—$CH_2$—$CH_2$—$CH_2$—$CH_2$—, and —$CH_2$—$CH_2$—$CH_2$—$CH_2$—$CH_2$—$CH_2$—.

In another non-limiting embodiment, each $Q_1$, $Q_2$, $Q_3$, and $Q_4$ is independently selected from the group consisting of functionalized and unfunctionalized $C_2$-$C_6$ alkylene. Non-limiting examples of such alkylene groups include:

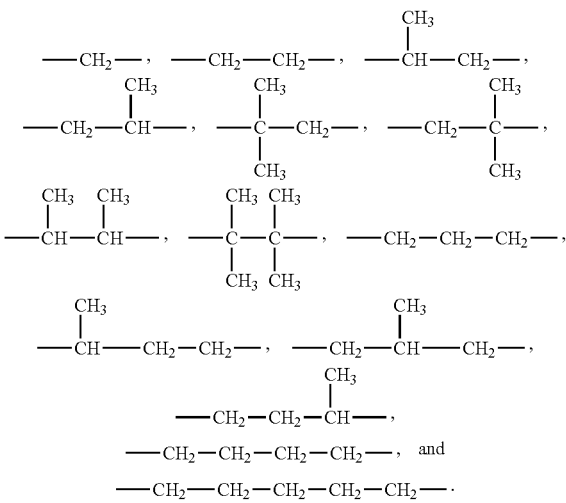

In one non-limiting embodiment, each $R_1$ and $R_2$ is independently selected from the group consisting of hydrogen, methyl and combinations thereof. In another non-limiting embodiment, $R_1$ and $R_2$ are hydrogens.

In another non-limiting embodiment, $R_1$ is independently hydrogen or methyl; $R_2$ is

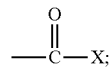

X is selected from the group consisting of $OR_3$, OM, halogens, and $N(R_4)(R_5)$; each $R_3$, $R_4$, and $R_5$ is independently selected from the group consisting of hydrogen and functionalized and unfunctionalized alkyl; and each M is independently selected from the group consisting of metal ions, ammonium ions, organic ammonium cations, and combinations thereof.

In another non-limiting embodiment, $R_1$ is independently hydrogen; $R_2$ is

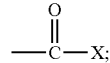

X is selected from the group consisting of $OR_3$, OM, halogens, and $N(R_4)(R_5)$; each $R_3$, $R_4$, and $R_5$ is independently selected from the group consisting of hydrogen and functionalized and unfunctionalized alkyl; and each M is independently selected from the group consisting of metal ions, ammonium ions, organic ammonium cations, and combinations thereof.

The monomer comprising at least one acryloyl moiety and at least one functionalized or unfunctionalized lactam moiety maybe be synthesized using methods described in the art, e.g., by reaction of an N-hydroxyalkyl lactam with carboxylic acids such as (meth)acrylic acid, esters such as (meth)acrylate esters, amides such as (meth)acrylamides, anhydrides such as (meth)acrylic anhydride, or similar compounds. Methods of synthesis include those described in patents: U.S. Pat. Nos. 2,882,262; 5,523,340; 6,369,163; U.S. Pat. Application Publication 2007/123673; GB924623; GB930668; GB1404989; WO03/006569; and EP385918. Each of the aforementioned patents is herein incorporated by reference in its entirety.

Non-limiting examples of N-hydroxyalkyl lactams include N-hydroxymethyl pyrrolidone, N-hydroxymethyl caprolactam, N-hydroxyethyl pyrrolidone, N-hydroxyethyl caprolactam, N-hydroxypropyl pyrrolidone, and N-hydroxypropyl caprolactam. Non-limiting examples of carboxylic acids include: acrylic acid, methacrylic acid, itaconic acid, crotonic acid, fumaric acid, succinic acid, and maleic acid. Non-limiting examples of acrylates and (meth)acrylates include methyl, ethyl, butyl, n-octyl, 2-ethylhexyl acrylates and their (meth)acrylate analogues. Non-limiting examples of anhydrides include (meth)acrylic anhydride, formic anhydride, succinic anhydride, and maleic anhydride.

In one non-limiting embodiment, the monomer comprising at least one acryloyl moiety and at least one functionalized or unfunctionalized lactam moiety used in the preparation of a homopolymer according to the claimed and/or disclosed inventive concept(s) has a structure:

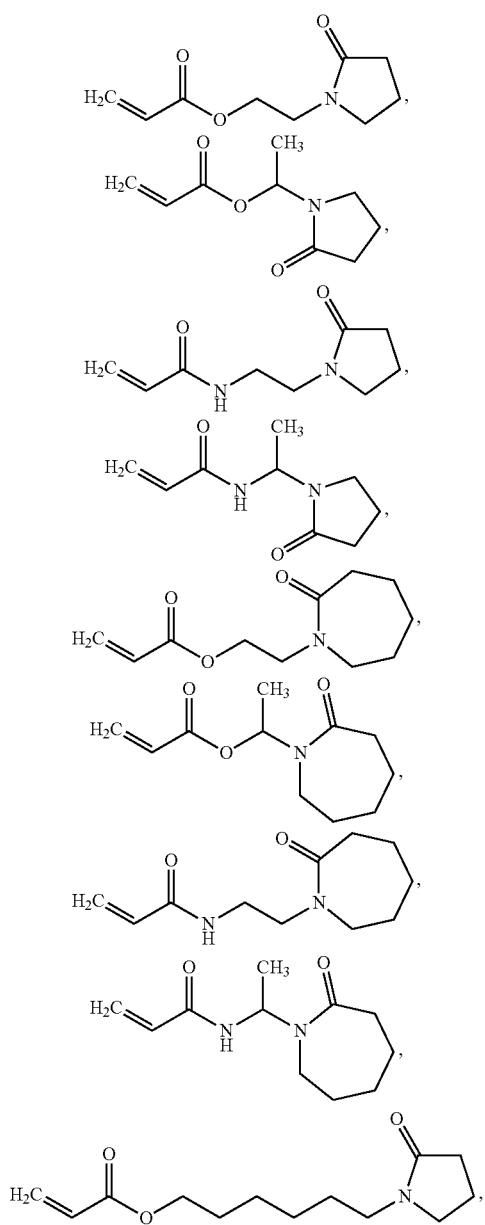

-continued

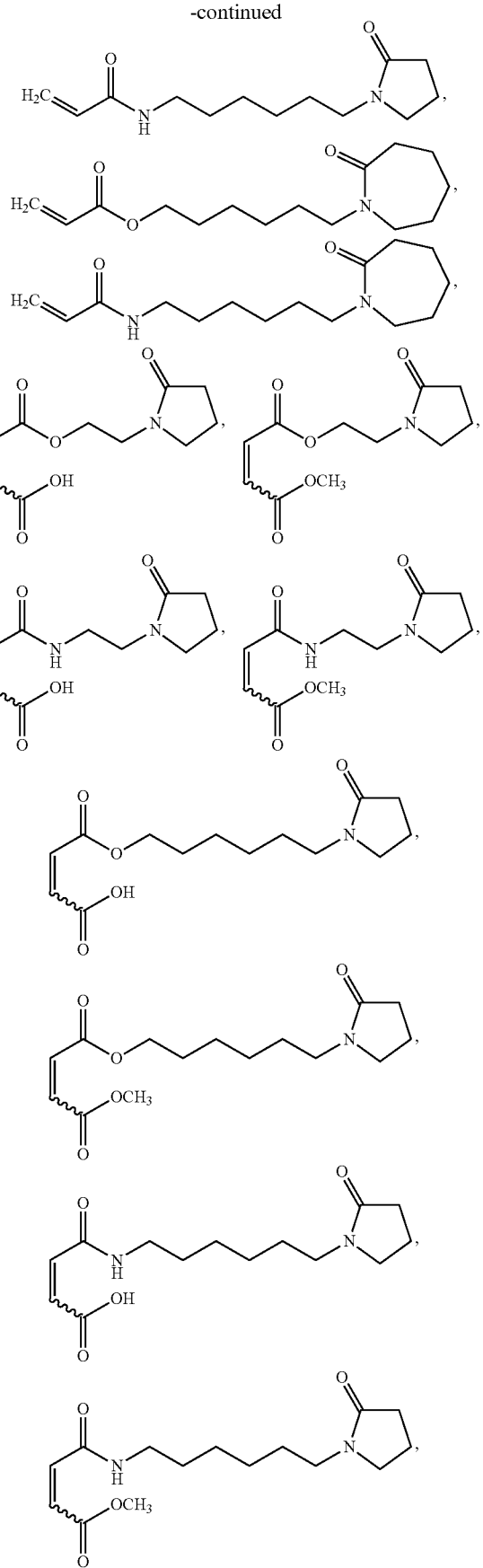

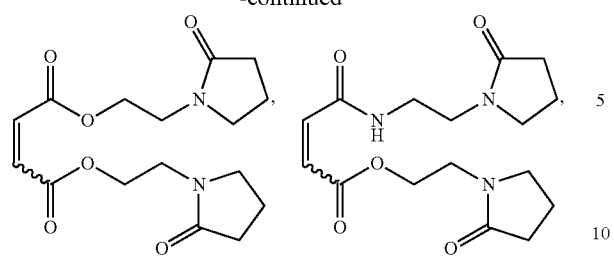
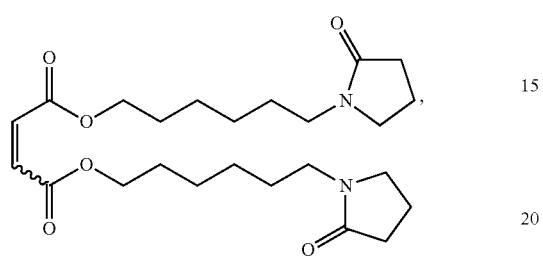
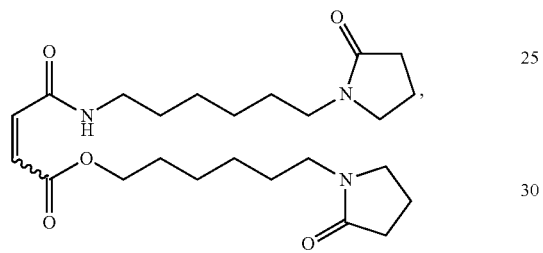
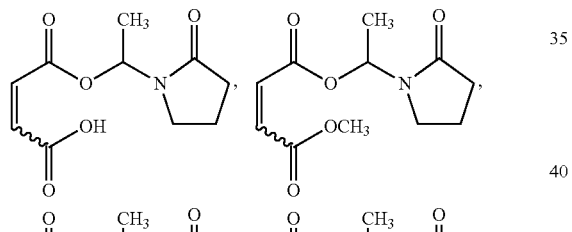
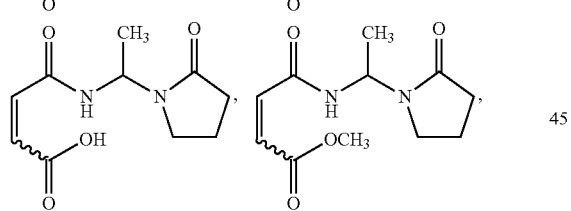
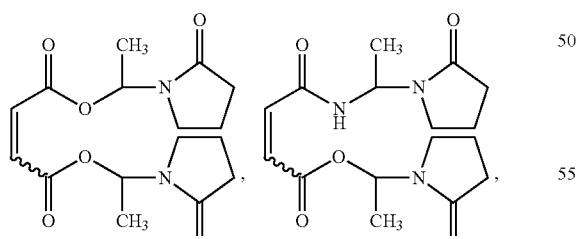
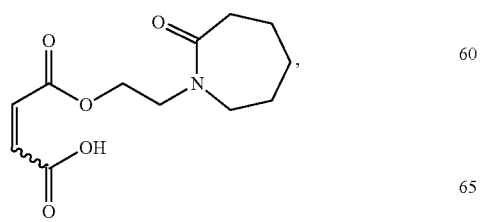
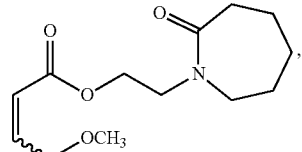
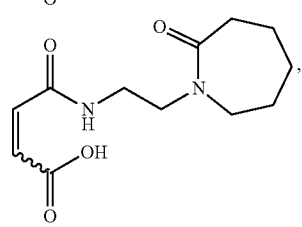
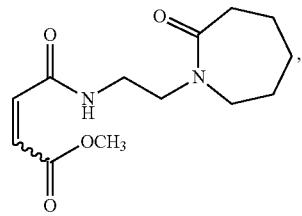
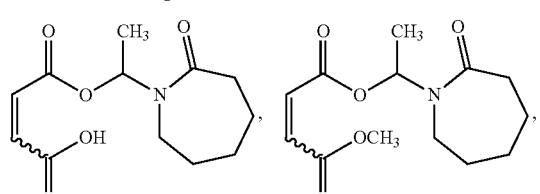
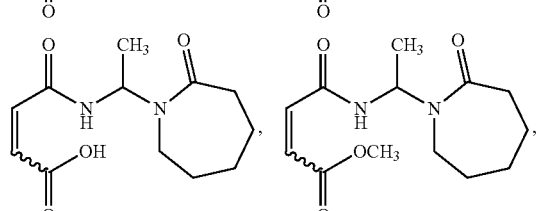
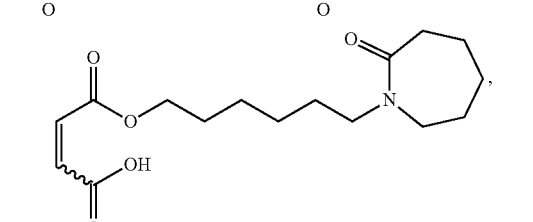
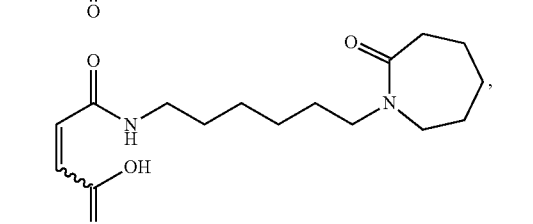
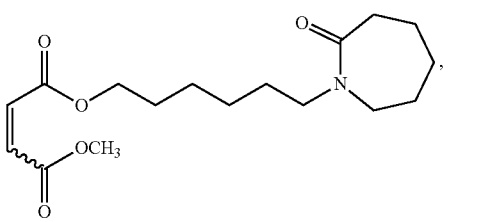

-continued

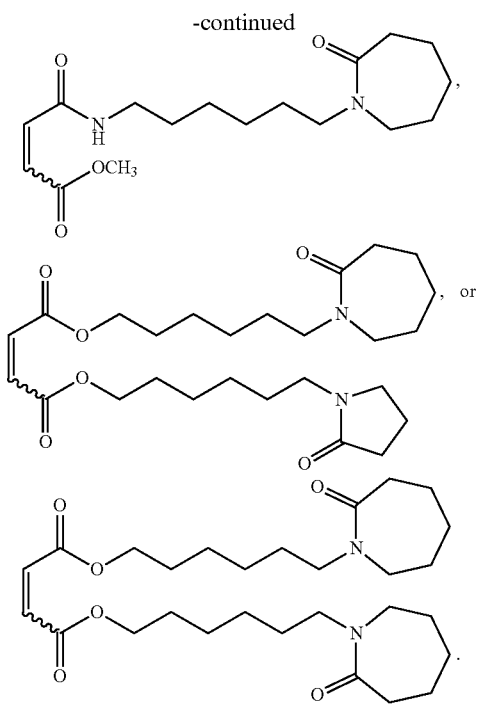

In a second aspect, the disclosed and/or claimed inventive concept(s) provides a method for preparation of a non-homopolymer comprising contacting in an aqueous medium: (1) a macromolecular chain transfer agent derived from at least one monomer A, (2) at least one monomer B, and (3) at least one non-radiation initiator, with the proviso that at least one of said monomer A and monomer B, but not both, is a monomer comprising at least one acryloyl moiety and at least one functionalized or unfunctionalized lactam moiety and other said monomer A or monomer B is a dissimilar comonomer.

In one non-limiting embodiment, monomer A is a monomer comprising at least one acryloyl moiety and at least one functionalized or unfunctionalized lactam moiety and monomer B is a dissimilar comonomer.

In another non-limiting embodiment, monomer B is a monomer comprising at least one acryloyl moiety and at least one functionalized or unfunctionalized lactam moiety and monomer A is a dissimilar comonomer.

In one non-limiting embodiment, the dissimilar comonomer is selected from the group consisting of hydrophilic comonomers, hydrophobic comonomers, and combinations thereof.

In one non-limiting embodiment, the aqueous medium is a homogeneous medium and said dissimilar comonomer is a hydrophilic comonomer.

In one non-limiting embodiment, the hydrophilic comonomer is selected from the group consisting of functionalized or unfunctionalized hydroxyalkyl (meth)acrylates, glyceryl (meth)acrylates, epoxyalkyl (meth)acrylates, N-alkylaminoalkyl (meth)acrylates, N,N-dialkylaminoalkyl (meth)acrylates, oligoethyleneglycol (meth)acrylates, etherified oligoethyleneglycol (meth)acrylates, polyalkyleneglycol (meth)acrylates, etherified polyalkyleneglycol (meth)acrylates, (meth)acrylamides, N-alkyl(meth)acrylamides, N,N-dialkyl(meth)acryl amides, N-hydroxyalkyl (meth)acrylamides, N-epoxyalkyl (meth)acrylamides, N-aminoalkyl (meth)acrylamides, N,N-dialkylaminoalkyl (meth)acrylamides, (meth)acrylates and (meth)acrylamides comprising sulfonic acid moieties and salts thereof, alkenyl sulfonic acids and salts thereof, (meth)acrylates and (meth) acrylamides comprising quaternary ammonium moieties, N-vinyl lactams, N-vinyl pyrrolidone, vinyl alcohol, N-alkenyl carboxamides, alpha-beta unsaturated dicarboxylic acids and salts thereof, alpha-beta unsaturated dicarboxylic anhydrides, amic acids, ester acids and salts thereof, diesters, diamides, esteramides, and combinations thereof.

In one non-limiting embodiment, the aqueous medium is a heterogeneous medium and said dissimilar comonomer is a hydrophobic comonomer.

In one non-limiting embodiment, the hydrophobic comonomer is selected from the group consisting of functionalized or unfunctionalized styrene, vinyl chloride, vinyl 2-ethylhexanoate, vinyl laurate, vinyl stearate, vinyl neopentanoate, vinyl 2-ethylhexanoate, vinyl neo-nonanoate, vinyl neo-decanoate, vinyl neo-undecanoate, vinyl neo-dodecanoate, isobutyl vinyl ether, 2-chloroethyl vinyl ether, stearyl vinyl ether, n-butyl acrylate, isobutyl acrylate, sec-butyl acrylate, tert-butyl acrylate, n-pentyl acrylate, neopentyl acrylate, n-hexyl acrylate, n-heptyl acrylate, n-octyl acrylate, isooctyl acrylate, isononyl acrylate, n-decyl acrylate, isodecyl acrylate, 2-ethylhexyl acrylate, benzyl acrylate, oleyl acrylate, palmityl acrylate, stearyl acrylate, n-butyl methacrylate, isobutyl methacrylate, sec-butyl methacrylate, tert-butyl methacrylate, n-pentyl methacrylate, neopentyl methacrylate, n-hexyl methacrylate, n-heptyl methacrylate, n-octyl methacrylate, isooctyl methacrylate, isononyl methacrylate, n-decyl methacrylate, isodecyl methacrylate, 2-ethylhexyl methacrylate, benzyl methacrylate, oleyl methacrylate, palmityl methacrylate, stearyl methacrylate, unsaturated vinyl esters of (meth)acrylic acid such as those derived from fatty acids and fatty alcohols, monomers derived from cholesterol, vinyl chloride, 1-butene, 2-butene, 1-pentene, 1-hexene, 1-octene, isobutylene, isoprene, and combinations thereof.

Further non-limiting examples of hydrophilic and hydrophobic monomers can be found in the Research Disclosure, the disclosure of which is herein incorporated by reference in its entirety.

In one non-limiting embodiment, the monomer comprising at least one acryloyl moiety and at least one functionalized or unfunctionalized lactam moiety used in the preparation of a non-homopolymer according to the claimed and/or disclosed inventive concept(s) has a structure:

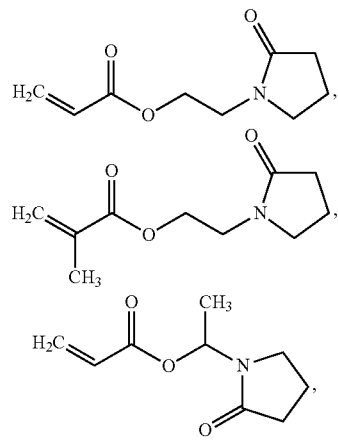

-continued

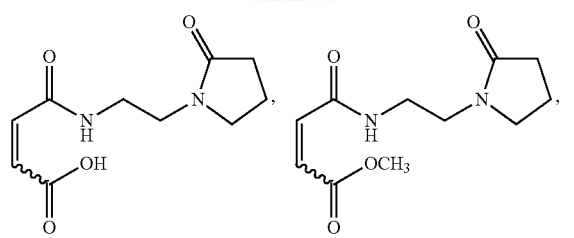
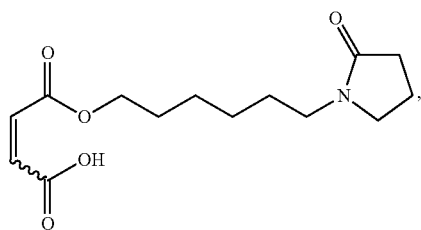
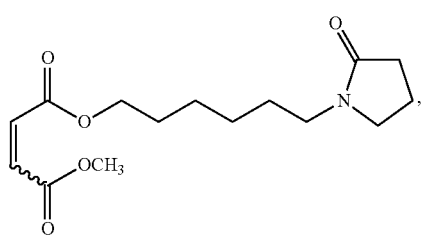
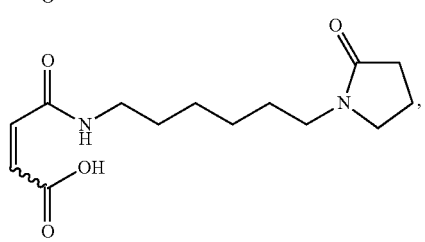
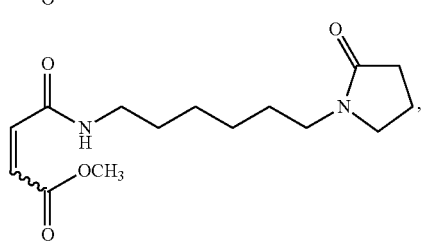
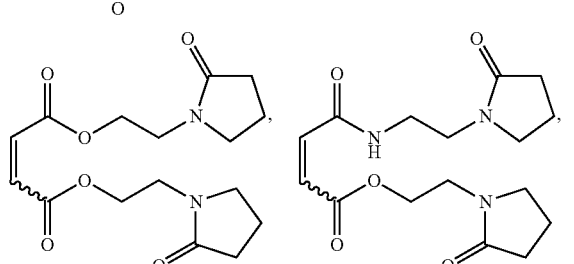
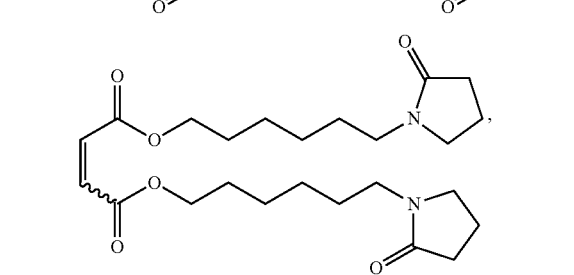
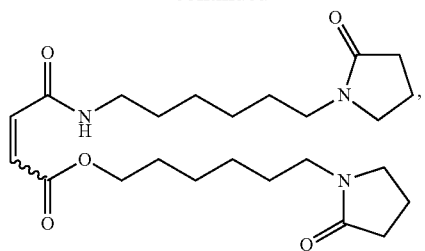
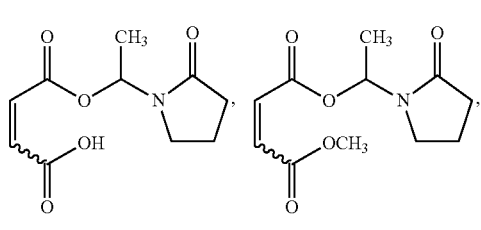
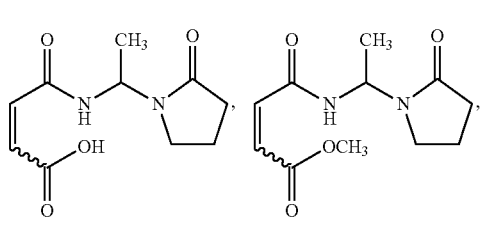
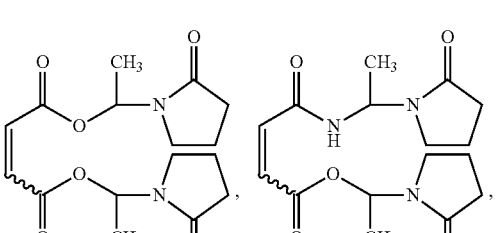
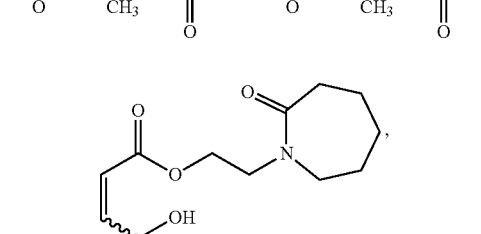
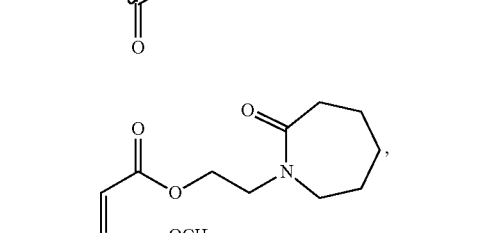
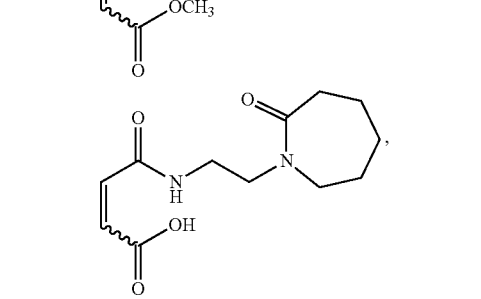

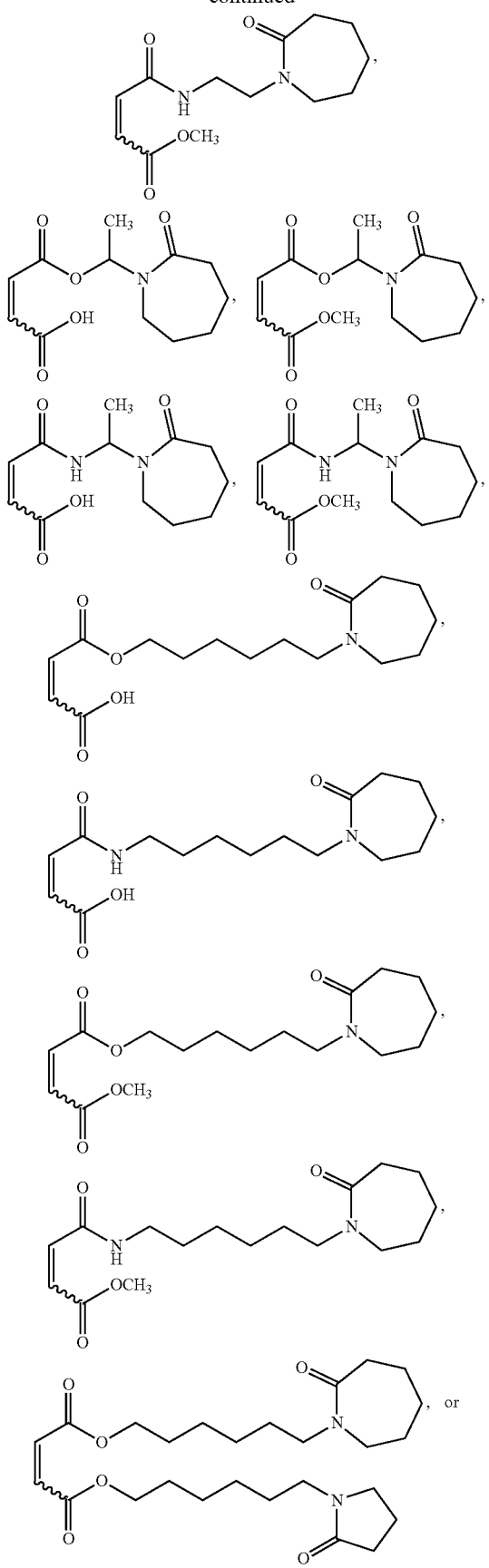

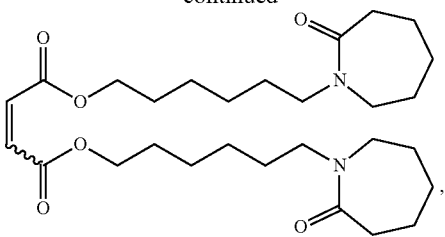

and combinations thereof.

Further non-limiting examples of monomers comprising at least one acryloyl moiety and at least one functionalized or unfunctionalized lactam moiety can be found in WO2011/063208, the disclosure of which is herein incorporated by reference in its entirety.

In one non-limiting embodiment, the reversible addition-fragmentation chain transfer agent is selected from the group consisting of dithioesters, trithiocarbonates, dithiocarbamates, xanthates, and combinations thereof.

Non-limiting examples of reversible addition-fragmentation chain transfer agents can be found in the following publications, each of which is herein incorporated by reference in its entirety: (1) *Polymer*, volume 49(5), 2008, 1079-1131; (2) *Macromolecules*, volume 50, 2017, 7433-7447; (3) U.S. Pat. No. 7,230,063; and (4) U.S. Pat. No. 7,632,966.

In one non-limiting embodiment, the non-homopolymer according to the claimed and/or disclosed inventive concept(s) is a diblock copolymer or a multiblock polymer.

In one non-limiting embodiment, the non-homopolymer according to the claimed and/or disclosed inventive concept(s) is a diblock copolymer.

In another non-limiting embodiment, the non-homopolymer according to the claimed and/or disclosed inventive concept(s) is a multiblock polymer.

In one non-limiting embodiment, the non-homopolymer according to the claimed and/or disclosed inventive concept(s) has a structure selected from the group consisting of:

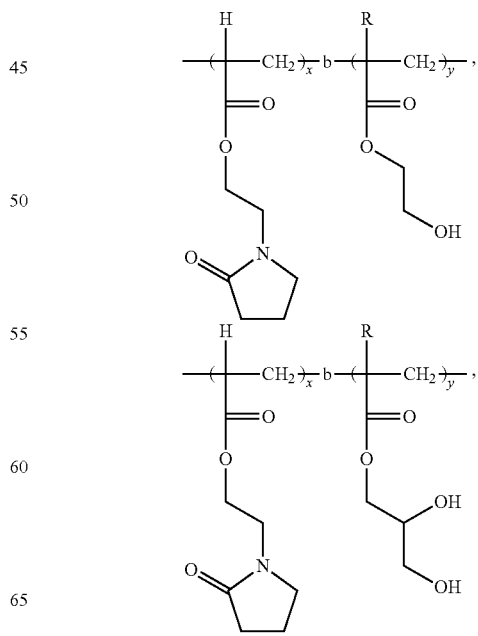

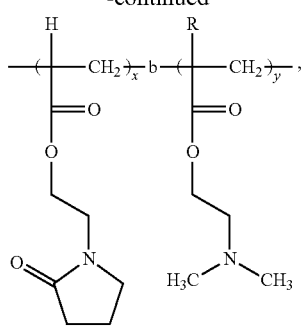
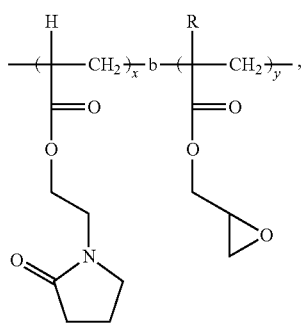
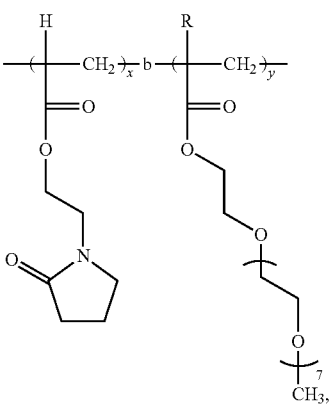
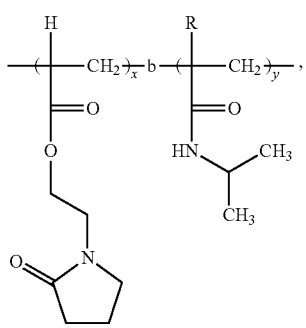
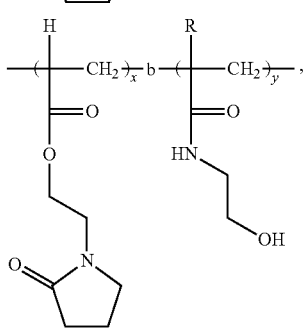
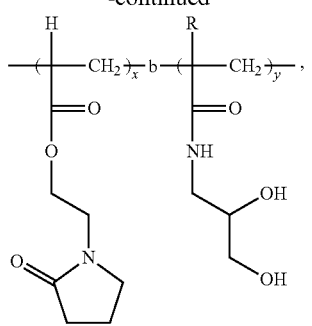
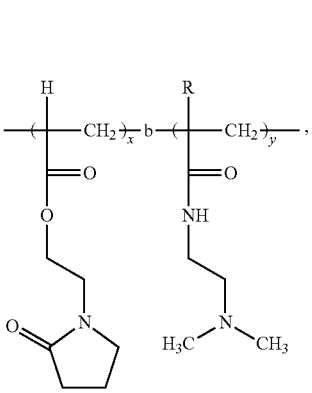
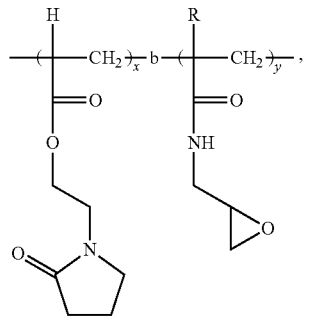
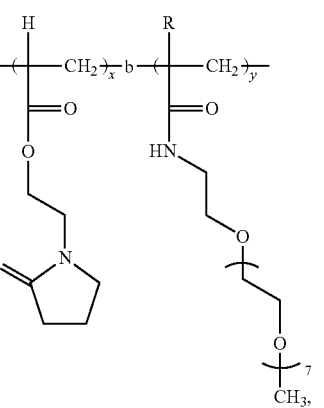

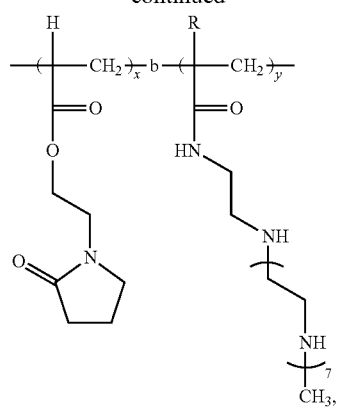
wherein each x and y is independently an integer having a value from about 10 to about 50000, and R is selected from the group consisting of hydrogen, methyl, and combinations thereof.
In another non-limiting embodiment, the non-homopolymer according to the claimed and/or disclosed inventive concept(s) has a structure selected from the group consisting of:
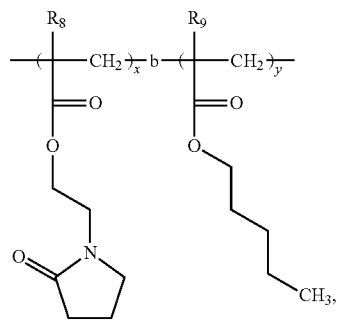
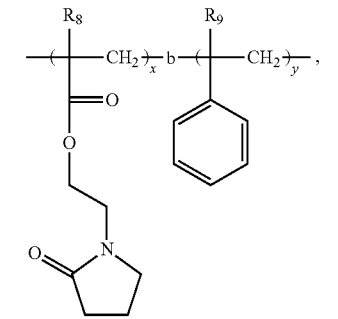
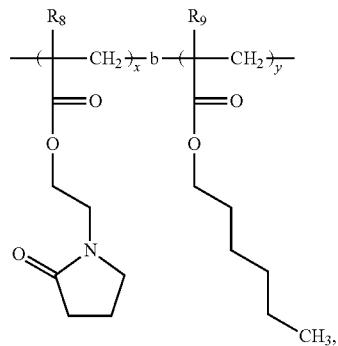
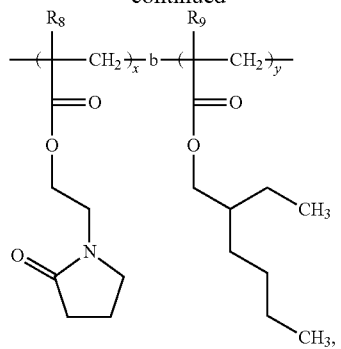
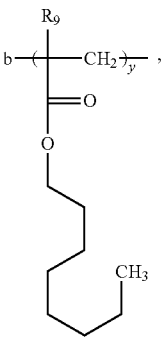
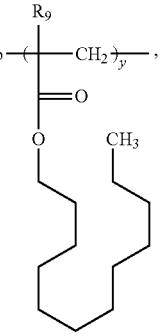
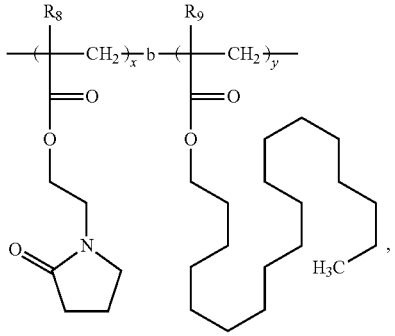
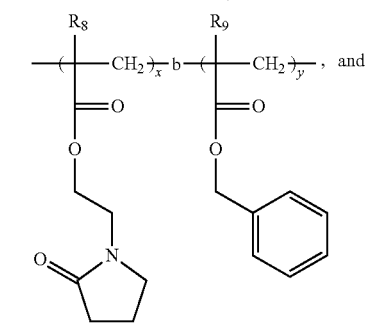

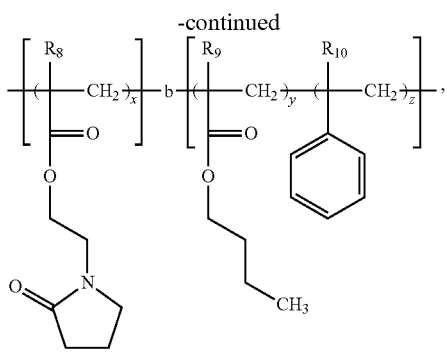

-continued wherein each x, y and z is independently an integer having a value from about 10 to about 50000, and $R_8$, $R_9$ and $R_{10}$ is selected from the group consisting of hydrogen, methyl, and combinations thereof.

Reversible addition-fragmentation chain transfer (RAFT) polymerization is one of the most robust and versatile methods for providing living characteristics to radical polymerization. With appropriate selection of the RAFT agent for the monomers and reaction conditions, it is applicable to the majority of monomers subject to radical polymerization. The process can be used in the synthesis of well-defined homo-, gradient, diblock, triblock, and star polymers and more complex architectures, which include microgels and polymer brushes.

When preparing, for example, a block copolymer in the presence of the control agent, the end of the growing block is provided with a specific functionality that controls the growth of the block by means of reversible free radical deactivation. The functionality at the end of the block is of such a nature that it can reactivate the growth of the block in a second and/or third stage of the polymerization process with other ethylenically unsaturated monomers providing a covalent bond between, for example, a first and second block [A] and [B] and with any further optional blocks.

Further details on the chemistry of synthesis of block copolymers by RAFT processes may be found in the following publications, each of which is herein incorporated in its entirety by reference: Polymer, 2008, volume 49, 1079-1131; Chemical Society Reviews, 2014, volume 43, 496-505; Macromolecules, 1998, volume 31, 5559-5562; and Polymer, 2013, volume 54, 2011-2019.

Further examples on methods of synthesis of block polymers according to the disclosed and/or claimed inventive concepts may be found in the Research Disclosure, the disclosure of which is herein incorporated by reference in its entirety.

The block copolymers according to the disclosed and/or claimed inventive concept(s) may be prepared according to the examples set out below. These examples are presented herein for purposes of illustration of the disclosed and/or claimed inventive conept(s) and are not intended to be limiting, for example, the preparations of the polymers. In the examples, the following abbreviations are used:

NAEP: N-2-(acryloyloxy)ethyl pyrrolidone
PNAEP: Poly(N-2-(acryloyloxy)ethyl pyrrolidone)
NMEP: N-2-(methacryloyloxy)ethyl pyrrolidone
HEA: 2-hydroxyethyl acrylate
PHEA: poly(2-hydroxyethyl acrylate)
GMA: Glycerol monomethacrylate
OEGA: Oligo(ethylene glycol) methyl ether acrylate
POEGA: Poly(oligo(ethylene glycol) methyl ether acrylate)
DEA: 2-(diethylamino)ethyl methacrylate
PDEA: Poly(-(diethylamino)ethyl methacrylate)
NIPAM: N-isopropylacrylamide
PNIPAM: Poly(N-isopropylacrylamide)
AscAc: Ascorbic acid
KPS: Potassium persulfate
SMA: Stearyl (meth)acrylate
BzMA: Benzyl (meth)acrylate
S: Styrene
PS: Polystyrene
nBA: n-butyl acrylate
PnBA: Poly(n-butyl acrylate)
P(S-stat-nBA): Statistical copolymer of S and nBA
AIBN: α,α'-azoisobutyronitrile
AVCA: 4,4'-azobis(4-cyanopentanoic acid)
DDMAT: 2-(dodecylthiocarbonothioylthio)-2-methylpropionic acid
PETTC: 4-cyano-4-(2-phenylethanesulfanylthiocarbonyl)sulfanylpentanoic acid
MPETTC: 4-(2-aminoethylmorpholine) amide of PETTC
CPDB: cyano-2-propyl benzodithioate
DMF: Dimethyl formamide
VA-044: 2,2-Azobis[2-(2-imidazolin-2-yl)propane]dihydrochloride
CTA: Chain transfer agent
DP: Degree of polymerization
GPC: Gel permeation chromatography
NMR: Nuclear magnetic resonance
$M_n$: Number-average molecular weight
$M_w$: Weight-average molecular weight

EXAMPLES

Synthesis of PNAEP Homopolymer

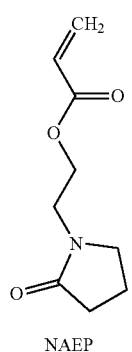

NAEP

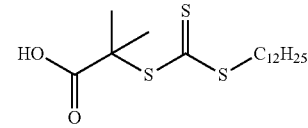

DDMAT

Example 1: [DDMAT]/[KPS] = 5, 30° C., pH 3, water, 60% w/w, 3 min.
OR
Example 2: [DDMAT]/[AIBN] = 5, 70° C., water, 60% w/w, 60 min.

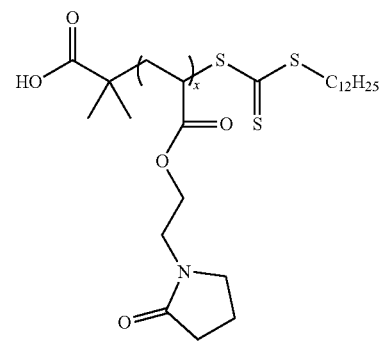

PNAEP

Example 1: RAFT Solution Homopolymerization of NAEP in Water at 30° C.

A typical protocol for the synthesis of a PNAEP$_{80}$ (mean DP=80) homopolymer is as follows: NAEP (1.00 g, 5.46 mmol), DDMAT RAFT agent (24.9 mg, 68.2 µmol; target DP=80) and AscAc (2.4 mg, 13.6 µmol; DDMAT/AscAc molar ratio=5.0) were weighed into a 14 mL vial charged with a magnetic flea and degassed with nitrogen in an ice bath for 30 min (reaction solution 1). Deionized water (0.6873 g, corresponding to a 60% w/w solution), and KPS (3.7 mg, 13.6 µmol; DDMAT/KPS molar ratio=5.0) were weighed into a separate 14 mL vial (reaction solution 2), sealed using a rubber septum and degassed with nitrogen in an ice bath for 30 min. After 30 min, the vial containing reaction solution 1 was immersed in an oil bath set at 30° C. Following this, reaction solution 2 was added to this vial via a degassed syringe and needle to reaction solution 1 under nitrogen. The polymerization was monitored for 5 min, resulting in a final monomer conversion of 99% as judged by $^1$H NMR spectroscopy. DMF GPC analysis indicated an $M_n$ of 12,300 g mol$^{-1}$ and an $M_w/M_n$ of 1.15. Targeting mean DPs of above 150 required reaction times of up to 60 min for high conversion.

Example 2: RAFT Solution Homopolymerization of NAEP in Water at 70° C.

NAEP (1.00 g, 5.46 mmol), DDMAT RAFT agent (24.9 mg, 68.2 µmol; target DP=80), deionized water (0.6847 g, corresponding to a 60% w/w solution), and AIBN (2.2 mg, 13.6 µmol; DDMAT/AIBN molar ratio=5.0) were weighed into a 14 mL vial charged with a magnetic flea. This reaction vial was then placed in an ice bath and degassed with nitrogen for 30 min. Following this, the vial was then immersed in an oil bath set at 70° C. and the reaction solution was stirred for 50 min, resulting in a final monomer conversion of 99% as judged by $^1$H NMR spectroscopy. DMF GPC analysis indicated an $M_n$ of 13,300 g mol$^{-1}$ and an $M_w/M_n$ of 1.14.

Glass transition temperatures ($T_g$) for four PNAEP$_x$ homopolymers prepared via RAFT aqueous solution polymerization of NAEP utilizing the low-temperature redox initiator were determined using differential scanning calorimetry (DSC) for DPs ranging between 50 and 400. This technique indicated $T_g$ values below room temperature for mean DPs of less than 400. A $T_g$ of approximately 19.6° C. was obtained for a PNAEP$_{400}$ homopolymer. A series of PNAEP homopolymers were prepared targeting a range of DPs using either AIBN or the low-temperature redox initiator. The results are presented in Table 1. A DDMAT/initiator molar ratio of 5.0 was used for all these homopolymerizations. DMF GPC analysis was used to determine the $M_n$ and $M_w/M_n$ values in each case. $^1$H NMR analysis indicated that high NAEP conversions (≥98%) were achieved using either AIBN at 70° C. or the redox initiator at 30° C. when targeting PNAEP DPs of up to 120 or 400, respectively. For PNAEP syntheses targeting a DP of 200, the faster rate of polymerization achieved at 30° C. did not adversely affect RAFT control over these polymerizations, with $M_w/M_n$ remaining less than 1.20 up to DP 400. Thus, the low-temperature redox initiator route was adopted for all subsequent RAFT syntheses. When targeting DPs above 400, reaction solutions became very viscous when using 60% w/w NAEP, which led to significantly lower conversions (<80%).

TABLE 1

Summary of Target PNAEP DP, conversions, molecular Weights ($M_n$), and dispersities ($M_w/M_n$) obtained for PNAEP homopolymers Prepared by RAFT Aqueous Solution Polymerization of NAEP at either 30° C. (low-temperature redox initiator) or 70° C. (AIBN) at 60% w/w Solids

| Example | Target PNAEP DP | Conversion (%) | Temperature ° C. | $M_n$ g/mol | $M_w/M_n$ |
|---|---|---|---|---|---|
| 3 | 40 | 99 | 70 | 7600 | 1.13 |
| 4 | 60 | 99 | 70 | 11200 | 1.13 |
| 5 | 80 | 99 | 70 | 13300 | 1.14 |
| 6 | 100 | 99 | 70 | 15700 | 1.19 |
| 7 | 120 | 99 | 70 | 19300 | 1.15 |
| 8 | 40 | 99 | 30 | 7400 | 1.19 |
| 9 | 60 | 99 | 30 | 10000 | 1.15 |
| 10 | 80 | 99 | 30 | 12300 | 1.15 |
| 11 | 100 | 98 | 30 | 15200 | 1.15 |
| 12 | 120 | 98 | 30 | 17100 | 1.16 |
| 13 | 150 | 99 | 30 | 21500 | 1.15 |
| 14 | 200 | 99 | 30 | 27600 | 1.16 |
| 15 | 400 | 99 | 30 | 41400 | 1.18 |
| 16 | 750 | 75 | 30 | 74600 | 1.26 |
| 17 | 1000 | 70 | 30 | 115400 | 1.26 |

Example 18: Preparation of PNAEPX Macro-CTA

The typical protocol for the synthesis of a PNAEP$_{62}$ macro-CTA by RAFT aqueous solution polymerization is as follows: NAEP (10.00 g, 54.6 mmol), DDMAT RAFT agent (199.0 mg, 0.5458 mmol; target DP=100) and AscAc (1.0 mg, 5.5 µmmol) were weighed into a 14 mL vial charged with a magnetic flea (reaction solution 1). This reaction solution was then placed in an ice bath and degassed with nitrogen for 30 min. Deionized water (6.8010 g, 60% w/w), and KPS (1.5 mg, 5.5 µmol; DDMAT/KPS molar ratio=100) were weighed into a second 14 mL vial (reaction solution 2) and degassed with nitrogen in an ice bath for 30 min. After 30 min, the vial containing reaction solution 1 was immersed in an oil bath set at 30° C. Reaction solution 2 was then added via a degassed syringe and needle to reaction solution 1 under nitrogen. The polymerization proceeded for 8 min before being quenched via exposure to air and immersed in an ice bath to quench the polymerization. $^1$H NMR analysis of the disappearance of vinyl signals assigned to PNAEP indicated a monomer conversion of 60%. The crude homopolymer was purified by precipitating into a ten-fold excess of diethyl ether. This purification protocol was repeated twice to give a PNAEP macro-CTA containing less than 1% residual monomer. The mean degree of polymerization was calculated to be 62 as judged by $^1$H NMR spectroscopy. DMF GPC analysis indicated an $M_n$ of 9,800 g mol$^{-1}$ and an $M_w/M_n$ of 1.25. Other PNAEP$_x$ macro-CTAs were obtained by adjusting the NAEP/DDMAT molar ratio.

Synthesis of PNAEP$_{62}$-PHEA$_y$ Diblock Copolymers

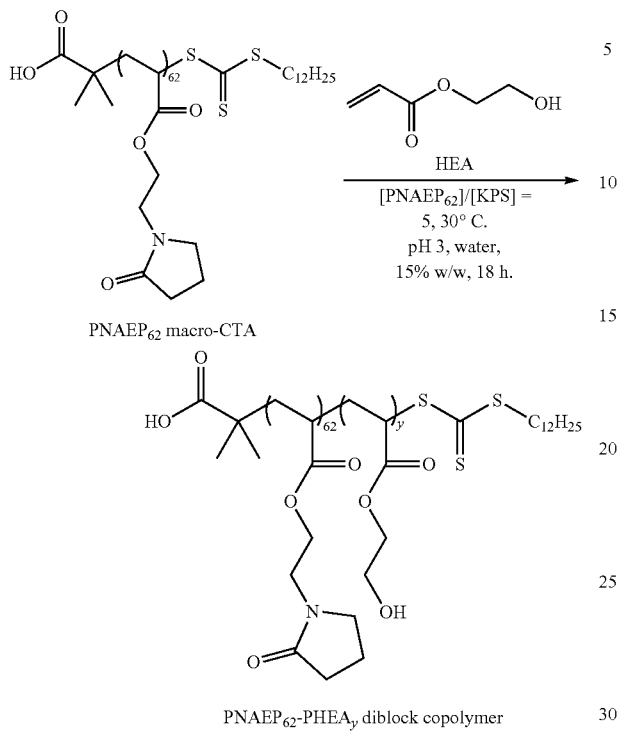

PNAEP$_{62}$ macro-CTA

PNAEP$_{62}$-PHEA$_y$ diblock copolymer

Example 19: PNAEP$_{62}$-PHEA$_y$ Diblock Copolymers with Target DP=100

PNAEP$_{62}$ macro-CTA (0.250 g, 21.3 μmol), HEA (0.2476 g, 2.1324 mmol; target DP=100) and AscAc (0.8 mg, 4.3 μmol; PNAEP$_{62}$ macro-CTA) were weighed into a 14 mL vial charged with a magnetic flea (reaction solution 1). This vial was immersed in an ice bath and the solution was degassed with nitrogen for 30 min. Deionized water (2.2306 g, corresponding to a 15% w/w solution) and KPS (1.2 mg, 4.3 μmol; PNAEP$_{62}$ macro-CTA/KPS molar ratio=5.0) were weighed into a separate 14 mL vial (reaction solution 2) and degassed with nitrogen in an ice bath for 30 min. Reaction solution 1 was then immersed in an oil bath set at 30° C. Reaction solution 2 was added to this vial via a degassed syringe and needle under nitrogen. The polymerization proceed for 18 h before being quenched by exposing the reaction solution to air and immersing the reaction vial in an ice bath. $^1$H NMR studies indicated more than 99% conversion while DMF GPC analysis indicated a M$_n$ of 29,400 g mol$^{-1}$ and an Mw/M. of 1.22.

Example 20: PNAEP$_{62}$-PHEA$_y$ Diblock Copolymers with Target DP Upto 400

PNAEP$_{62}$ macro-CTA (obtained as per Example 3) was used to prepare a series of PNAEP$_{62}$-PHEA$_x$ diblock copolymers via RAFT aqueous solution polymerization of HEA targeting PHEA DPs of between 50 and 400. A DDMAT/KPS molar ratio of 5.0 was used in all cases. $^1$H NMR studies indicated that high HEA conversions (>99%) were achieved within 18 h. Furthermore, DMF GPC analysis of the resulting PNAEP$_{62}$-PHEA$_x$ diblock copolymers indicated a linear increase in M$_n$ with increasing PHEA DP.

Relatively low dispersities (M$_w$/M$_n$<1.35) were obtained for all PNAEP$_{62}$-PHEA$_x$ diblock copolymers. Moreover, comparison with the GPC trace recorded for the PNAEP$_{62}$ macro-CTA confirmed high blocking efficiencies in each case.

Synthesis of PNAEP$_{71}$-POEGA$_y$ Diblock Copolymers

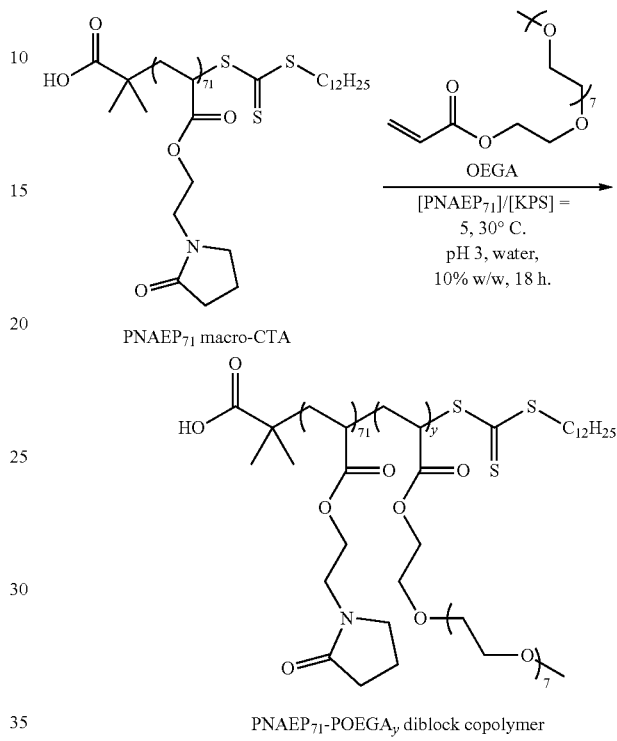

PNAEP$_{71}$ macro-CTA

PNAEP$_{71}$-POEGA$_y$ diblock copolymer

Example 21: PNAEP$_{71}$-POEGA$_y$ Diblock Copolymers with Target DP=100

PNAEP$_{71}$ macro-CTA (0.250 g, 21.3 μmol), OEGA (M$_n$≈454 g mol$^{-1}$, 0.3872 g, 853 μmol; target DP=40) and AscAc (0.8 mg, 4.3 μmol) were weighed into a 14 mL vial charged with a magnetic flea (reaction solution 1). This vial was placed in an ice bath and the solution was degassed with nitrogen for 30 min. Deionized water (2.3066 g, corresponding to a 20% w/w solution), and KPS (1.2 mg, 4.3 μmol; PNAEP$_{71}$ macro-CTA/KPS molar ratio=5.0) were weighed into a separate 14 mL vial (reaction solution 2) and degassed with nitrogen using an ice bath for 30 min. Reaction solution 1 was immersed in an oil bath set at 30° C. Reaction solution 2 was then added to this vial via a degassed syringe and needle under nitrogen. $^1$H NMR studies indicated more than 99% conversion while DMF GPC analysis indicated an M$_n$ of 20,400 g mol$^{-1}$ and an M$_w$/M$_n$ of 1.27.

Example 22: PNAEP$_{71}$-POEGA$_y$ Diblock Copolymers with Target DP Upto 400

PNAEP$_{71}$ macro-CTA was utilized for the RAFT aqueous solution polymerization of OEGA, targeting POEGA DPs of between 50 and 400 and using a DDMAT/KPS molar ratio of 5.0. OEGA conversions of at least 99% were achieved for all PNAEP$_{71}$-POEGA$_x$ diblock copolymers within 18 h at 30° C., as judged by $^1$H NMR. DMF GPC analyses of this series of PNAEP$_{71}$-POEGA$_x$ diblock copolymers indicated a monotonic increase in M$_n$ with increasing POEGA DP, as expected. Relatively low dispersities (M$_w$/M$_n$<1.30) were achieved for this PNAEP$_{71}$-POEGA$_x$ diblock copolymer series, which suggests good RAFT control. Moreover, comparison of the GPC traces obtained for these PNAEP$_{71}$-POEGA$_x$ diblock copolymers with that of the precursor PNAEP$_{71}$ macro-CTA indicated high blocking efficiencies.

Synthesis of PNAEP$_{95}$-PNIPAM$_x$ Diblock Copolymers

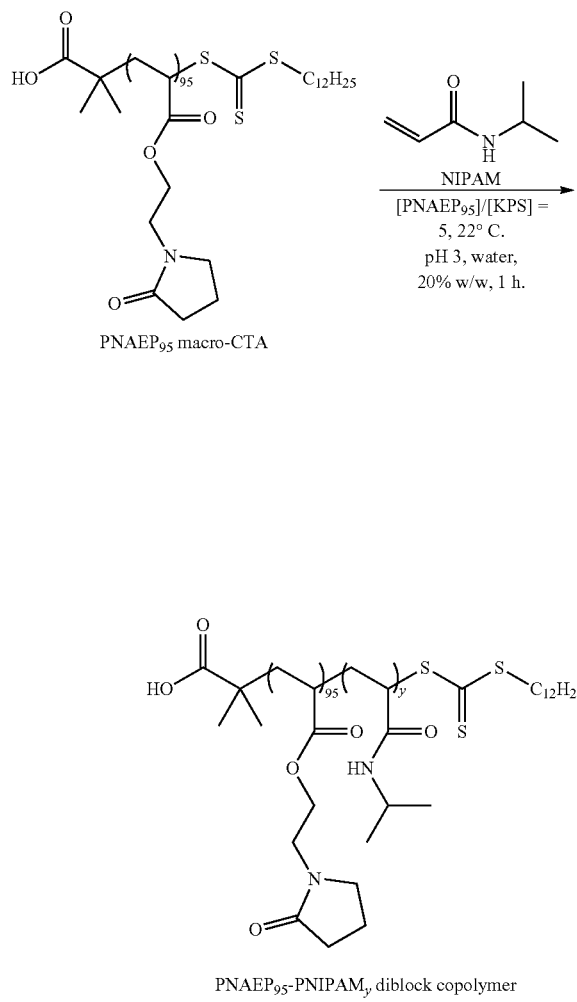

Example 23: PNAEP$_{95}$-PNIPAM$_y$ Diblock Copolymers with Target DP=100 to 300

The RAFT polymerization of NIPAM was conducted in an oil bath set to 22° C., which is below the LCST of PNIPAM homopolymer (~32° C.). NIPAM conversions of at least 99% were achieved for all PNAEP$_{95}$-PNIPAM$_y$ diblock copolymers within 1 h at this temperature, as judged by $^1$H NMR studies conducted in D$_2$O. DMF GPC analysis of this series of PNAEP$_{95}$-PNIPAM$_y$ diblock copolymers indicated a monotonic increase in $M_n$ with increasing PNIPAM DP. Relatively low dispersities ($M_w/M_n$<1.40) were observed in all cases, indicating reasonably good RAFT control. Moreover, comparison of the GPC traces obtained for these PNAEP$_{95}$-PNIPAM$_y$ diblock copolymers with that of the precursor PNAEP$_{95}$ macro-CTA indicated relatively high blocking efficiencies.

Example 24: Preparation of PDEAX Macro-CTA

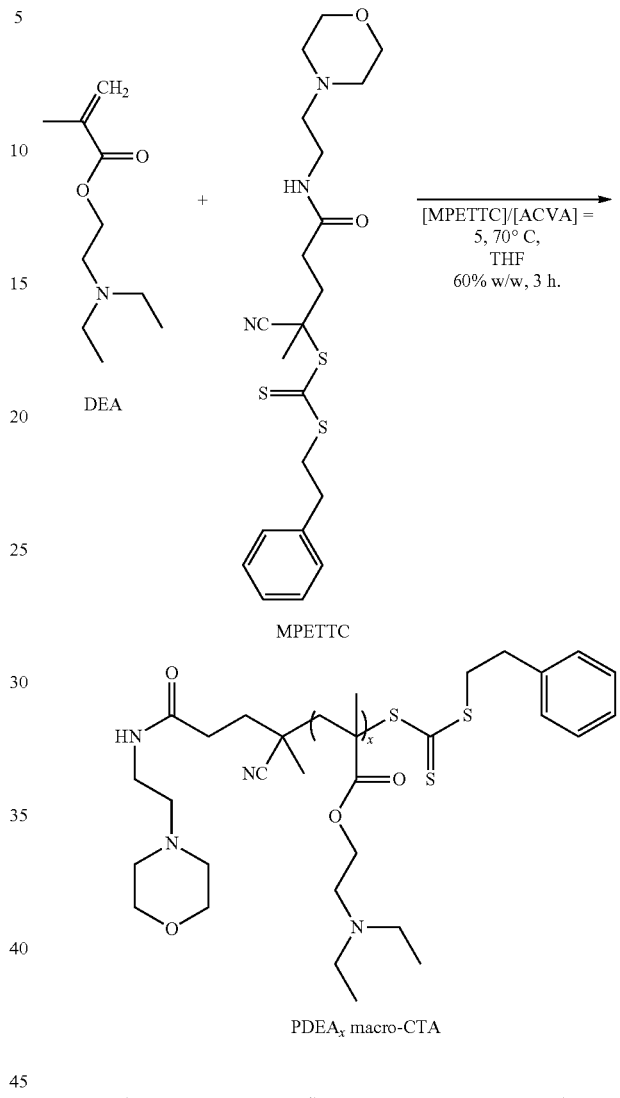

DEA (10.00 g, 54.0 mmol), MPETTC RAFT agent (244.1 mg, 0.540 mmol; target DP=100), ACVA (50.4 mg, 180 μmol; MPETTC/ACVA molar ratio=3.0) and THF (6.86 g, corresponding to a 60% w/w solution) were weighed into a 50 mL round-bottom flask charged with a magnetic flea. This flask was placed in an ice bath and degassed with nitrogen for 30 min before being immersed in an oil bath set at 70° C. The polymerization proceed for 190 min, affording a monomer conversion of 95% as judged by 11-1 NMR. The crude homopolymer was purified by precipitation into a ten-fold excess of mildly alkaline water (pH 10). This neutral PDEA homopolymer was then dried under vacuum before being protonated using an aqueous solution of 1.0 M HCl. The fully protonated PDEA homopolymer was isolated in its HCl salt via precipitation into a ten-fold excess of acetone. This homopolymer was then dried in a vacuum oven to afford a PDEA macro-CTA containing less than 1% residual monomer. Its mean degree of polymerization was determined to be 99 by $^1$H NMR spectroscopy. Chloroform GPC analysis indicated an $M_n$ of 10,800 g mol$^{-1}$ and an $M_w/M_n$ of 1.24.

Example 25: Synthesis of PDEA$_{100}$-PNAEP$_y$ Diblock Copolymers

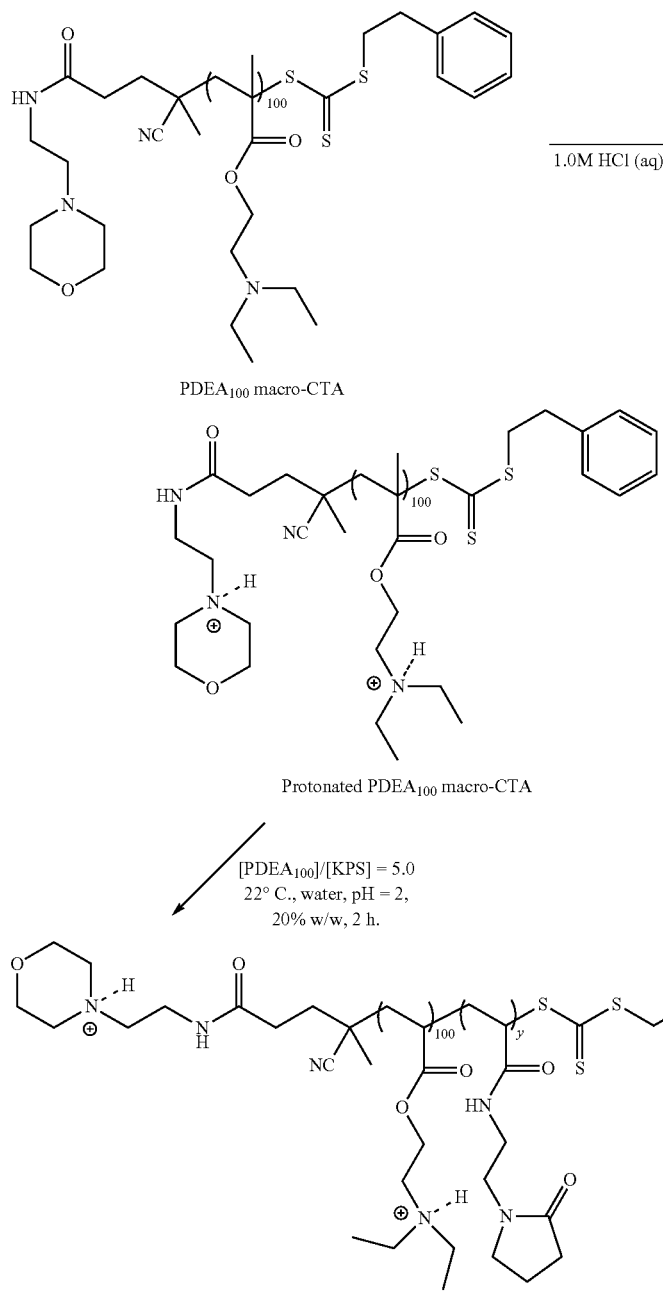

PDEA$_{100}$ macro-CTA (200 mg, 10.5 NAEP (190 mg, 1.054 mmol; target DP=100) and AscAc (0.37 mg, 2.1 µmol) were weighed into a 14 mL vial charged with a magnetic flea (reaction solution 1). This vial was immersed in an ice bath and degassed with nitrogen for 30 min. Dilute aqueous HCl (0.001 M, 1.12 g), and KPS (57 mg, 2.1 µmol; PDEA$_{100}$ macro-CTA/KPS molar ratio=3.0) were weighed into a separate 14 mL vial (reaction solution 2; final pH 2), which was immersed in an ice bath and degassed with nitrogen for 30 min. The vial containing reaction solution 1 was then immersed in an oil bath set at 30° C. Reaction solution 2 was added to this vial using a degassed syringe/needle under nitrogen to afford a final solution at pH 2 targeting 30% w/w solids. $^1$H NMR studies indicated that an NAEP conversion of 99% was achieved after 120 min. Other diblock copolymer compositions were obtained by adjusting the NAEP/PDEA$_{100}$ macro-CTA molar ratio to give target PNAEP DPs ranging from 50 to 100.

Example 26: Preparation of PNAEP$_{67}$ Macro-CTA

NAEP (10.00 g, 54.6 mmol), DDMAT RAFT agent (199.0 mg, 0.546 mmol; target DP=100), and AscAc (1.0 mg, 5.5 µmol) were weighed into a 14 mL vial charged with a magnetic flea (reaction solution 1). This reaction solution was then placed in an ice bath and degassed with nitrogen for 30 min. Deionised water (4.372 g, 70% w/w) and KPS (1.5 mg, 5.5 µmol; DDMAT/KPS molar ratio=100) were weighed into a second 14 mL vial (reaction solution 2) and degassed with nitrogen in an ice bath for 30 min. After 30 min, the vial containing reaction solution 1 was immersed in an oil bath set at 30° C. Reaction solution 2 was then added using a degassed syringe and needle to reaction solution 1 under nitrogen. The NAEP polymerisation proceeded for 8 min before being quenched via exposure to air and immersed in an ice bath. $^1$H NMR analysis of the disappearance of vinyl signals indicated a monomer conversion of 62%. The crude PNAEP homopolymer was purified by dialysis against water (72 h) using a 3500 MWCO dialysis membrane (Fisher Scientific) to give a PNAEP macro-CTA containing less than 1% residual monomer. Its mean DP was calculated to be 67 as judged by $^1$H NMR spectroscopy analysis in CDCl$_3$. Chloroform GPC analysis indicated an $M_n$ of 19.2 kg mol$^{-1}$ and an Mw/M, of 1.19.

Example 27: Preparation of PNAEP$_{67}$-PS$_y$ Diblock Copolymer

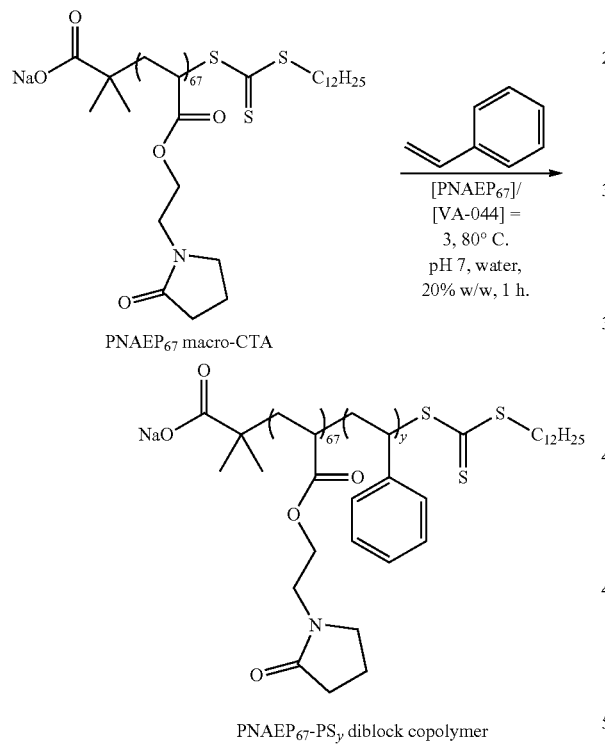

PNAEP$_{67}$-PS$_y$ diblock copolymer

A typical protocol used for the synthesis of the PNAEP$_{67}$-PS$_{350}$ diblock copolymer was as follows: PNAEP$_{67}$ macro-CTA (0.185 g, 14.6 μmol), deionised water (2.880 g, corresponding to a 20% w/w solution) and VA-044 (1.580 mg, 4.9 μmol; PNAEP$_{67}$/VA-044=3.0) were weighed into a 10 mL round-bottom flask charged with a magnetic flea. NaOH (20 μL, 1 M) was added to raise the pH to 7.0. This flask was then immersed in an ice bath and the solution was degassed with nitrogen for 30 min. Styrene (1.0 g) was weighed into a separate 14 mL vial and degassed with nitrogen in an ice bath for 30 min. After 30 min, styrene (0.59 ml, 5.12 mmol; target DP=350) was added to the flask using a degassed syringe and needle under nitrogen. The contents of the flask were then stirred vigorously to ensure thorough mixing and degassed for a further 5 min before being immersed in an oil bath set at 80° C. The styrene polymerisation was allowed to proceed for 2 h before being quenched by exposing the reaction solution to air and immersing the reaction vial in an ice bath. $^1$H NMR spectroscopy analysis of the disappearance of vinyl signals indicated a final styrene conversion of 99%. Chloroform GPC analysis indicated a $M_n$ of 46.6 kg mol$^{-1}$ and an $M_w/M_n$ of 1.28. Other target diblock copolymer compositions were obtained by adjusting the styrene/PNAEP$_{67}$ molar ratio.

Example 28: Preparation of PNAEP$_{67}$-PnBA$_y$ Diblock Copolymer

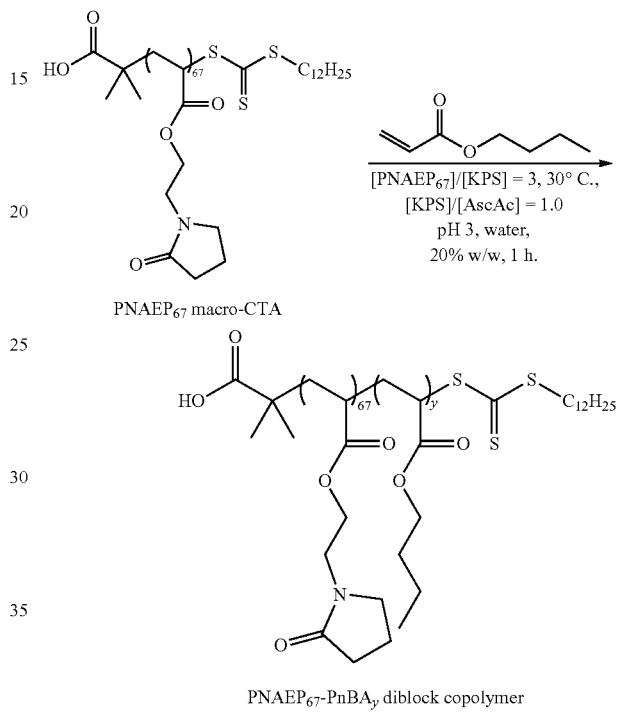

PNAEP$_{67}$-PnBA$_y$ diblock copolymer

A typical protocol used for the synthesis of the PNAEP$_{67}$-PnBA$_{500}$ diblock copolymer was as follows: PNAEP$_{67}$ macro-CTA (0.185 g, 14.6 μmol), deionised water (4.501 g, corresponding to a 20% w/w solution) and KPS (1.320 mg, 4.9 μmol; PNAEP$_{67}$/KPS=3.0) were weighed into a 10 mL round-bottom flask charged with a magnetic flea. HCl (10 μL, 0.2 M) was added to reduce the pH to 3.0. This flask was then immersed in an ice bath, and the solution was degassed with nitrogen for 30 min. nBA (1.500 g) was weighed into a separate 14 mL vial and degassed with nitrogen in an ice bath for 30 min. An AsAc stock solution (0.01% w/w) was weighed into a second 14 mL vial and degassed with nitrogen in an ice bath for 30 min. After 30 min nBA (1.05 ml, 7.32 mmol; target DP=500) was added to the flask using a degassed syringe and needle under nitrogen. The flask contents were then stirred vigorously to ensure thorough mixing and degassed for 5 min before being immersed in an oil bath set at 30° C. After 1 min, AsAc (0.09 ml, 4.9 μmol; KPS/AsAc molar ratio=1.0) was added to the flask. The nBA polymerisation was allowed to proceed for 1 h before being quenched by exposing the reaction solution to air and immersing the reaction vial in an ice bath. $^1$H NMR spectroscopy analysis of the disappearance of vinyl signals indicated a final nBA conversion of 99%. Chloroform GPC analysis of this copolymer indicated a $M_n$ of 86.6 kg mol$^{-1}$ and an $M_w/M_n$ of 1.56. Other diblock copolymer compositions were obtained by adjusting the nBA/PNAEP$_{67}$ molar ratio.

Example 29: Preparation of PNAEP$_{67}$-P(S-Stat-nBA)$_y$ Diblock Copolymer

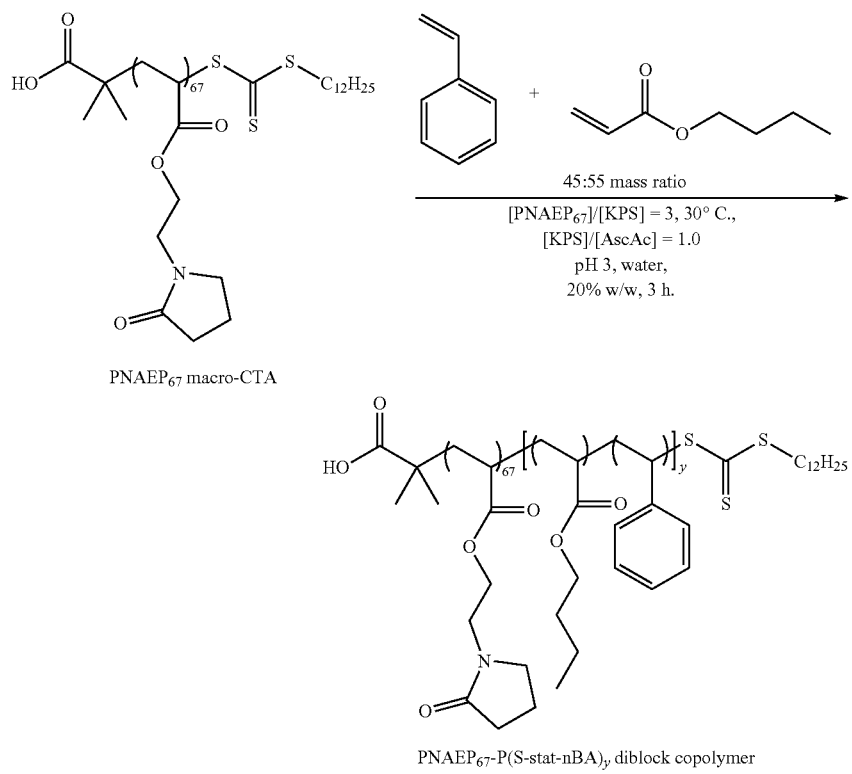

PNAEP$_{67}$-P(S-stat-nBA)$_y$ diblock copolymer

A typical protocol used for the synthesis of the PNAEP$_{67}$-P(S-stat-nBA)$_{400}$ diblock copolymer was as follows: PNAEP$_{67}$ macro-CTA (0.185 g, 14.6 μmol), deionised water (3.472 g, corresponding to a 20% w/w solution) and KPS (1.320 mg, 4.9 μmol; PNAEP$_{67}$/KPS=3.0) were weighed into a 10 mL round-bottom flask charged with a magnetic flea. HCl (10 μL, 0.2 M) was added to reduce the pH to 3.0. This flask was then immersed in an ice bath, and the solution was degassed with nitrogen for 30 min. nBA and styrene (1.500 g) were weighed into separate 14 mL vials and degassed with nitrogen in an ice bath for 30 min. An AsAc stock solution (0.01% w/w) was weighed into a second 14 mL vial and degassed with nitrogen in an ice bath for 30 min. After 30 min styrene (0.34 ml, 2.97 mmol) and nBA (0.41 ml, 2.89 mmol; overall copolymer DP=400, nBA content=55% by mass) was added to the flask using a degassed syringe and needle under nitrogen. The flask contents were then stirred vigorously to ensure thorough mixing and degassed for 5 min before being immersed in an oil bath set at 30° C. After 1 min, AscAc (0.09 ml, 4.9 μmol; KPS/AscAc molar ratio=1.0) was added to the flask. The polymerisation was allowed to proceed for 3 h before being quenched by exposing the reaction solution to air and immersing the reaction vial in an ice bath. $^1$H NMR spectroscopy analysis of the disappearance of vinyl signals indicated a final comonomer conversion of 99% conversion. Chloroform GPC analysis of this copolymer indicated a M$_n$ of 86.6 kg mol$^{-1}$ and an Mw/M$_n$ of 1.56. Other diblock copolymer compositions were obtained by adjusting the (styrene+nBA)/PNAEP$_{67}$ molar ratio.

Example 30: Preparation of PNMEP$_{28}$ Macro-CTA

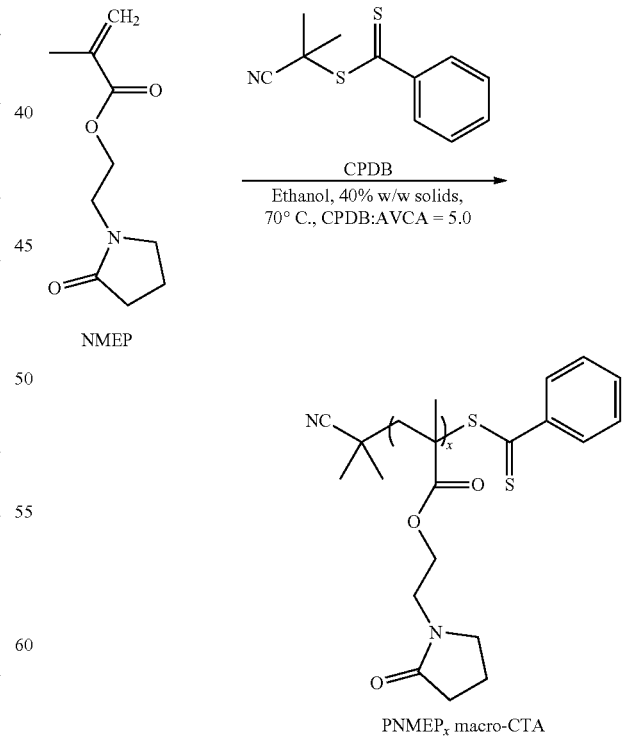

The typical protocol for the preparation of PNMEP$_{28}$ macro-CTA is described below. NMEP (9.37 g, 47.4 mmol), CPDB RAFT agent (0.30 g, 1.36 mmol; target DP=35), ACVA (76.0 mg, 0.27 mmol; CPDB/ACVA molar ratio=5.0) and ethanol (14.59 g, 40% w/w solids) were weighed into a 50 mL round-bottom flask immersed in an ice bath and degassed with continuous stirring for 30 min. The reaction was allowed to proceed for 270 min in an oil bath set to 70° C., resulting in a monomer conversion of 90% as judged by $^1$H NMR spectroscopy. The polymerization was then quenched by exposing the hot reaction solution to air and cooling to 20° C. The crude polymer was precipitated into excess diethyl ether to remove residual monomer before freeze-drying in the minimum amount of water to afford a dry pink powder. The mean DP was calculated to be 28 by comparing the integrated aromatic protons arising from the CPDB RAFT agent. GPC analysis using chloroform eluent indicated an $M_n$ of 5000 g mol$^{-1}$ and $M_w/M_n$ of 1.23 against a series of ten near-monodisperse poly(methyl methacrylate) calibration standards.

Example 31: Preparation of PNMEP$_{28}$-PLMA$_y$ Diblock Copolymer

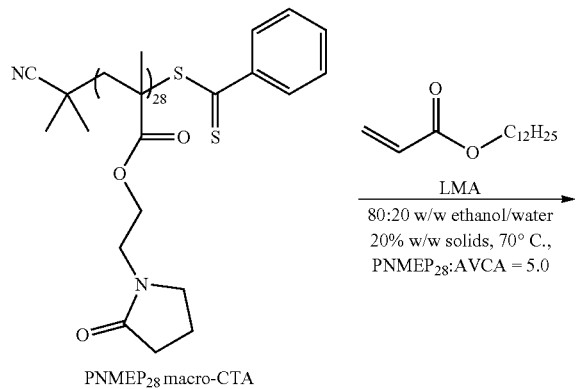

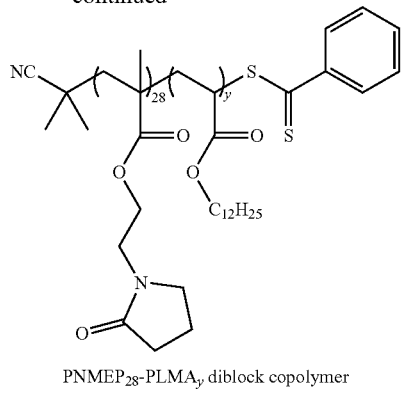

PNMEP$_{28}$-PLMA$_y$ diblock copolymer

A typical protocol for the synthesis of PNMEP$_{28}$-PLMA$_{87}$ (LMA/NMEP mass ratio=4:1) is described as follows: PNMEP$_{28}$ macro-CTA (0.15 g, 26.10 μmol), LMA (0.58 g, 2.27 mmol; target DP=87 and ACVA (1.50 mg, 5.22 μmol; 0.19 mL of a 7.89 g dm$^{-3}$ ethanolic stock solution; PNMEP$_{28}$/ACVA molar ratio=5.0) were dissolved in an 80:20 w/w ethanol-water mixture (2.92 g). The reaction vial was sealed and degassed under N$_2$ for 30 min before placing in a pre-heated oil bath set at 70° C. for 16 h. The polymerization was quenched by exposing the hot reaction solution to air and cooling to 20° C. The resulting diblock copolymer nanoparticles were characterized by $^1$H NMR spectroscopy, DLS and TEM with 0.01% w/w dispersions being prepared via dilution using an 80:20 w/w ethanol-water mixture. Chloroform GPC analysis indicated an $M_n$ of 19 800 g mol$^{-1}$ and an Mw/$M_n$ of 1.28.

Other diblock compositions were synthesized by adjusting the amount of LMA monomer to target LMA/NMEP mass ratios ranging between 2:1 and 7:1. Table 2 shows the corresponding DPs of the PLMA blocks. $^1$H NMR analysis indicated that more than 98% monomer conversion was achieved in all cases.

TABLE 2

Summary of the target diblock copolymer compositions. LMA monomer conversions, residual levels of NMEP and LMA monomer, molecular weight data and glass transition temperature (Tg) values.

| Example | Target diblock copolymer composition | LMA Conversion$^a$ (%) | Residual NMEP$^b$ ppm | Residual LMA$^c$ ppm | $M_n^d$ g/mol | $M_w/M_n^d$ | PLMA $T_g^e$ °C. | PNMEP $T_g^e$ °C. |
|---|---|---|---|---|---|---|---|---|
| 32 | PNMEP macro-CTA | n.d | n.d | n.d | 5,000 | 1.23 | n.d | 65 |
| 33 | PNMEP$_{28}$-PLMA$_{43}$ | >99 | 136 | — | 13,300 | 1.22 | −48 | 48 |
| 34 | PNMEP$_{28}$-PLMA$_{65}$ | >99 | 309 | — | 17,100 | 1.22 | −48 | 45 |
| 35 | PNMEP$_{28}$-PLMA$_{87}$ | >99 | 199 | 983 | 19,800 | 1.28 | −46 | 46 |
| 36 | PNMEP$_{28}$-PLMA$_{109}$ | 99 | 132 | 1037 | 22,100 | 1.29 | −47 | — |
| 37 | PNMEP$_{28}$-PLMA$_{130}$ | 99 | 155 | 1156 | 25,000 | 1.34 | −48 | — |
| 38 | PNMEP$_{28}$-PLMA$_{152}$ | 99 | 168 | 1153 | 26,100 | 1.40 | −47 | — | n.d = not determined
$^a$LMA conversion determined by $^1$H NMR spectroscopy using a 10:1 d$_1$-chlorofom:d$_6$-acetone mixture.
$^b$Determined by HPLC—Agilent Poroshell EC-C18 100 × 4.6 mm × 3.5 μm. 0.1% (v/v) aqueous orthophosphoric acid (A)/acetonitrile (B) (5% B to 100% B in 20 minutes, 2-minute hold at 100% B, re-equilibrate at 5% for 5 minutes), flow rate of 0.40 mL min$^{-1}$.
$^c$Determined by gas chromatography—Restek Rxi-624Sil-MS capillary column (30 m × 0.32 mm, D$_f$ = 1.8 μm), H$_2$ carrier gas, 45.5 cm s$^{-1}$. Oven programme- 2 min hold at 100° C., 10° C. min$^{-1}$ ramp to 300° C., 4-minute hold.
$^d$Determined by chloroform GPC using a refractive index detector and expressed relative to a series of poly(methyl methacrylate) calibration standards.
$^e$Determined by DSC at a rate of 10° C. min$^{-1}$ Copolymer Characterization ¹H NMR Spectroscopy:

¹H NMR spectra were recorded at 25° C. in $d_4$-methanol using a 400 MHz Bruker Avance-400 spectrometer (64 scans averaged per spectrum).

GPC:

The molecular weights and dispersities of the homopolymers series and diblock copolymers were determined by using an Agilent 1260 infinity set-up comprising two Polymer Laboratories PL gel 5 μm Mixed-C columns and a refractive index detector operating at 60° C. The mobile phase was HPLC-grade DMF containing 10 mmol LiBr at a flow rate of 1.0 mL min$^{-1}$. Ten near-monodisperse poly (methyl methacrylate) standards (PMMA; Mn=625 to 618,000 g mol$^{-1}$) were used for calibration. The molecular weights and dispersities of the PDEA homopolymers were determined by using an Agilent 1260 infinity set-up comprising two Polymer Laboratories PL gel 5 μm Mixed-C columns and a refractive index detector operating at 35° C. The mobile phase was HPLC-grade chloroform containing 0.25% v/v TEA at a flow rate of 1.0 mL min$^{-1}$. Ten near-monodisperse poly(methyl methacrylate) standards (PMMA; $M_n$=625 to 618,000 g mol$^{-1}$) were used for calibration.

Visible Absorption Spectroscopy.

Spectra were recorded from 400 to 800 nm for 1.0% w/w aqueous solutions of various PNAEP and PNMEP homopolymers between 20 and 80° C. at 5° C. increments using a Shimadzu UV-1800 spectrometer. An increase in turbidity at 600 nm indicated the lower critical solution temperature (LCST) of the polymer. Spin-coated copolymer films were prepared by depositing a 200 μL aliquot of a 20% w/w aqueous dispersion onto a glass slide mounted on a vacuum-free Ossila Spin Coater (initially rotating at 250 rpm, followed by rapid acceleration up to 3000 rpm for 15 min). For transmittance studies, films were prepared as described above and their transparency was assessed by visible absorption spectroscopy using a Perkin-Elmer Lambda 25 spectrometer. Spectra were recorded from 200 to 800 nm at 2 nm intervals at a scan speed of 960 nm/min. Copolymer film thicknesses were measured using a micrometer screw gauge.

Dynamic Light Scattering (DLS).

DLS studies were conducted using a Malvern Instruments Zetasizer Nano series instrument equipped with a 4 mW He—Ne laser (λ=633 nm) and an avalanche photodiode detector. Scattered light was detected at 173°. Intensity-average hydrodynamic diameters were calculated via the Stokes-Einstein equation, while zeta potentials were determined via the Henry equation using the Smoluchowski approximation Transmission Electron Microscopy (TEM).

As-prepared 20% w/w copolymer dispersions were diluted at 20° C. to generate 0.10% w/w aqueous dispersions. Copper/palladium TEM grids (Agar Scientific, UK) were coated in-house to produce thin films of amorphous carbon. These grids were then treated with a plasma glow discharge for 30 s to create a hydrophilic surface. One droplet of aqueous diblock copolymer dispersion (20 μL; 0.10% w/w) was placed on a freshly-treated grid for 1 min and then blotted with filter paper to remove excess solution. To stain the deposited nanoparticles, an aqueous solution of uranyl formate (10 μL; 0.75% w/w) was placed on the sample-loaded grid via micropipet for 20 s and then carefully blotted to remove excess stain. Each grid was then dried using a vacuum hose. Imaging was performed using a Philips CM100 instrument operating at 100 kV and equipped with a Gatan 1 k CCD camera.

Small-Angle X-Ray Scattering (SAXS).

SAXS patterns were recorded at a national synchrotron facility (station 122, Diamond Light Source, Didcot, Oxfordshire, UK) using monochromatic X-ray radiation (λ=0.124 nm with q ranging from 0.01 to 2.00 nm$^{-1}$ where q=4π sin θ/λ is the length of the scattering vector and θ is one-half of the scattering angle) and a 2D Pilatus 2M pixel detector (Dectris, Switzerland). A glass capillary of 2 mm diameter was used as a sample holder and all measurements were conducted on 1.0% w/w copolymer dispersions in 80:20 w/w ethanol-water. X-ray scattering data were reduced and normalized using standard routines by the beamline and were further analyzed using Irena SAS macros for Igor Pro.

Reversed Phase High Performance Liquid Chromatography (Reversed Phase HPLC).

HPLC analysis was performed on an HP 1100 series LC equipped with a quadratic pump, an autosampler and a diode array detector. An Agilent Poroshell EC-C18 100×4.6 mm column with a particle size of 3.5 μm was used at 40° C. The mobile phase consisted of water with 0.1% (v/v) orthophosphoric acid (A) and acetonitrile (B) and was run under gradient conditions (5% B to 100% B in 20 minutes, 2-minute hold at 100% B, re-equilibrate at 5% for 5 minutes) at a flow rate of 0.40 mL min$^{-1}$, a run time of 27 min and an injection volume of 5 μL. The analyte was detected at a wavelength of 210 nm, against a 360 nm reference wavelength. Nanoparticle dispersions were diluted to 2.0% w/w using deionized water. The resulting dispersions were shaken for 20 minutes and decanted into centrifugal cut-off filters (Merck Amicon Ultra-4, 3 KDa nominal molecular weight) to remove high molecular weight polymeric material. These were centrifuged at an RCF of 8422 g (9000 rpm; rotor radius=9.3 cm) for 20 min to produce 4 ml approx. aqueous filtrate for evaluation and quantitation of residual NMEP monomer. Concentration was measured based the detector response of external NMEP standards of known concentration.

Differential Scanning Calorimetry (DSC).

DSC studies were performed using a TA Instruments Discovery DSC instrument equipped with TZero low-mass aluminium pans and hermetically-sealed lids. Copolymers (and homopolymers) were equilibrated above their glass transition temperatures for 10 min before performing two consecutive thermal cycles at a rate of 10° C. min−1. Two cycles were performed to minimise the thermal history of each sample.

Molecular weight data for both the PNMEP homopolymer precursor and the series of PNMEP$_{28}$-PLMA$_y$ diblock copolymers were obtained using chloroform GPC at 35° C., with the eluent containing 0.25% TEA by volume. Two Polymer Laboratories PL gel 5 μm Mixed C columns were connected in series to a Varian 390 multidetector suite (refractive index detector) and a Varian 290 LC pump injection module using a flow rate of 1.0 mL min−1. Ten near-monodisperse poly (methyl methacrylate) standards (PMMA; $M_n$=625-618000 g mol$^{-1}$) were used for calibration and data were analysed using Varian Cirrus GPC software. UV GPC chromatograms were obtained simultaneously by detection at a fixed wavelength of 308 nm, which corresponds to the absorption maximum of the dithiobenzoate RAFT end-groups.

Glass transition temperatures for six PNMEP$_{28}$-PLMA$_y$ diblock copolymers were determined using a Pyris 1 Perkin-Elmer differential scanning calorimeter operating over a temperature range from −90 to 100° C. at a heating/cooling rate of 10° C. min$^{-1}$. Each copolymer (10 mg) was dried for at least 24 h in a vacuum oven at 70° C. prior to analysis.

Dried samples were hermetically sealed in a vented aluminum pan, and the instrument was calibrated for heat flow and temperature using both indium and zinc standards. Samples were annealed at 100° C. for 5 min before cooling to −90° C. and maintaining this temperature for 1 min. The glass transition temperature (Tg) was then determined by heating the copolymer up to 100° C.

What is claimed is:

1. A method for preparation of a homopolymer comprising contacting in an aqueous medium:
   (1) a monomer comprising at least one acryloyl moiety and at least one lactam moiety having a structure:

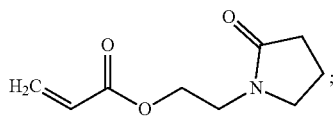

(2) at least one chain transfer agent, wherein said chain transfer agent is a trithiocarbonate-based reversible addition-fragmentation chain transfer agent, and
   (3) at least one non-radiation initiator selected from the group consisting of a persulfate initiator and an azo initiator.

2. The method for preparation of a homopolymer according to claim 1, wherein said aqueous medium further comprises at least one non-aqueous solvent.

3. The method for preparation of a homopolymer according to claim 2, wherein said non-aqueous solvent is selected from the group consisting of functionalized or unfunctionalized alcohols, acids, ethers, ketones, nitriles, lactones, esters, amines, amides, carbonates, carbamates, halocarbons, hydrocarbons, and combinations thereof.

* * * * *